(12) United States Patent
Gross

(10) Patent No.: US 7,885,849 B2
(45) Date of Patent: *Feb. 8, 2011

(54) SYSTEM AND METHOD FOR PREDICTING DEMAND FOR ITEMS

(75) Inventor: John N. Gross, San Francisco, CA (US)

(73) Assignee: Hayley Logistics LLC, Las Vegas, NV (US)

(*) Notice: Subject to any disclaimer, the term of this patent is extended or adjusted under 35 U.S.C. 154(b) by 1312 days.

This patent is subject to a terminal disclaimer.

(21) Appl. No.: 10/862,931

(22) Filed: Jun. 7, 2004

(65) Prior Publication Data

US 2004/0260600 A1    Dec. 23, 2004

Related U.S. Application Data

(60) Provisional application No. 60/476,392, filed on Jun. 5, 2003.

(51) Int. Cl.
*G06F 17/30* (2006.01)

(52) U.S. Cl. ..................................................... 705/10
(58) Field of Classification Search .................... 705/10
See application file for complete search history.

(56) References Cited

U.S. PATENT DOCUMENTS

| | | |
|---|---|---|
| 4,870,579 A | 9/1989 | Hey |
| 4,996,642 A | 2/1991 | Hey |
| 5,459,306 A | 10/1995 | Stein et al. |
| 5,717,865 A | 2/1998 | Stratmann |
| 5,884,282 A | 3/1999 | Robinson |
| 5,901,246 A | 5/1999 | Hoffberg et al. |
| 5,903,454 A | 5/1999 | Hoffberg et al. |
| 5,918,014 A | 6/1999 | Robinson |
| 5,974,398 A | 10/1999 | Hanson et al. |
| 6,049,778 A | 4/2000 | Walker et al. |
| 6,064,980 A | 5/2000 | Jacobi et al. |
| 6,266,649 B1 | 7/2001 | Linden et al. |
| 6,314,420 B1 | 11/2001 | Lang et al. |
| 6,389,372 B1 | 5/2002 | Glance et al. |
| 6,418,424 B1 | 7/2002 | Hoffberg |
| 6,484,123 B2 | 11/2002 | Srivastava |
| 6,526,440 B1 | 2/2003 | Bharat |

(Continued)

FOREIGN PATENT DOCUMENTS

WO    WO 98/34189    8/1998

(Continued)

OTHER PUBLICATIONS

Solomon, Mary, "Targeting Trendsetters: Cyberstudies capture the perceptions and insights of early adopters"; Marketing Research, Summer 1996, vol. 8, No. 2.*

(Continued)

*Primary Examiner*—Romain Jeanty
*Assistant Examiner*—Mark A Fleischer
(74) *Attorney, Agent, or Firm*—Sterne, Kessler, Goldstein & Fox PLLC

(57) ABSTRACT

A system and method for determining and identifying demand for items based on observing behavior of trendsetters within a member population, such as an online community. The trendsetters are determined by studying historical adoption behavior of a group within the member population.

25 Claims, 9 Drawing Sheets

ITEM CORRELATIONS

| 1 | 2 | 3 | 4 | 5 | 6 | 7 | 8 | 9 | ... | |
|---|---|---|---|---|---|---|---|---|---|---|
| X | X | X | X | X | X | X | X | X | ... | |
| A | A | A | ... | ... | .. | ... | ... | ... | | |
| B | B | B | H | E | L | K | .... | ... | ... | |
| C | E | F | .... | ... | ... | ... | ... | ... | ... | |
| D | J | M | N | .... | .... | .... | ... | ... | .... | |
| ... | ... | ... | ... | ... | .... | ... | ... | ... | .... | |
| | | | | | | | | | | |

U.S. PATENT DOCUMENTS

| | | |
|---|---|---|
| 6,600,898 B1 | 7/2003 | De Bonet et al. |
| 6,609,096 B1 | 8/2003 | De Bonet et al. |
| 6,687,696 B2 | 2/2004 | Hofmann et al. |
| 6,697,800 B1 | 2/2004 | Jannink et al. |
| 6,735,572 B2 * | 5/2004 | Landesmann ............... 705/14 |
| 6,766,525 B1 | 7/2004 | Lee et al. |
| 6,775,664 B2 | 8/2004 | Lang et al. |
| 6,782,370 B1 | 8/2004 | Stack |
| 6,801,909 B2 | 10/2004 | Delgado et al. |
| 6,853,982 B2 | 2/2005 | Smith et al. |
| 6,912,505 B2 | 6/2005 | Linden et al. |
| 7,043,531 B1 | 5/2006 | Seibel et al. |
| 7,113,917 B2 | 9/2006 | Jacobi et al. |
| 7,155,401 B1 | 12/2006 | Cragun et al. |
| 7,356,490 B1 | 4/2008 | Jacobi et al. |
| 7,536,322 B1 * | 5/2009 | Selinger et al. ............... 705/27 |
| 2001/0013009 A1 | 8/2001 | Greening et al. |
| 2002/0042733 A1 | 4/2002 | Lesandrini et al. |
| 2002/0078056 A1 | 6/2002 | Hunt et al. |
| 2002/0097265 A1 | 7/2002 | Kurapati et al. |
| 2002/0123988 A1 | 9/2002 | Dean et al. |
| 2002/0133417 A1 | 9/2002 | Hanks et al. |
| 2002/0154157 A1 | 10/2002 | Sherr et al. |
| 2002/0174429 A1 | 11/2002 | Gutta et al. |
| 2002/0180805 A1 | 12/2002 | Chickering et al. |
| 2002/0184139 A1 | 12/2002 | Chickering et al. |
| 2002/0194079 A1 | 12/2002 | Kimble |
| 2003/0033292 A1 | 2/2003 | Meisel et al. |
| 2003/0036944 A1 | 2/2003 | Lesandrini et al. |
| 2003/0046156 A1 | 3/2003 | Cromer et al. |
| 2003/0050805 A1 | 3/2003 | Gouyet et al. |
| 2003/0050815 A1 | 3/2003 | Seigel et al. |
| 2003/0055816 A1 | 3/2003 | Paine et al. |
| 2003/0055898 A1 | 3/2003 | Yeager et al. |
| 2003/0074253 A1 | 4/2003 | Scheuring et al. |
| 2003/0093329 A1 | 5/2003 | Gutta |
| 2003/0093331 A1 | 5/2003 | Childs et al. |
| 2003/0093338 A1 | 5/2003 | Kim et al. |
| 2003/0093793 A1 | 5/2003 | Gutta |
| 2003/0097302 A1 | 5/2003 | Overhultz |
| 2003/0135490 A1 | 7/2003 | Barrett et al. |
| 2003/0135513 A1 | 7/2003 | Quinn et al. |
| 2003/0149614 A1 | 8/2003 | Andrus et al. |
| 2003/0167195 A1 | 9/2003 | Fernandes et al. |
| 2003/0195793 A1 * | 10/2003 | Jain et al. ............... 705/10 |
| 2003/0204449 A1 | 10/2003 | Kotas et al. |
| 2003/0208399 A1 | 11/2003 | Basak et al. |
| 2003/0208578 A1 | 11/2003 | Taraborelli et al. |
| 2003/0212619 A1 | 11/2003 | Jain et al. |
| 2003/0216942 A1 | 11/2003 | Hawks |
| 2003/0233278 A1 | 12/2003 | Marshall |
| 2004/0015386 A1 | 1/2004 | Abe et al. |
| 2004/0030525 A1 | 2/2004 | Robinson et al. |
| 2004/0034570 A1 | 2/2004 | Davis |
| 2004/0054572 A1 | 3/2004 | Oldale et al. |
| 2004/0068451 A1 | 4/2004 | Lenk et al. |
| 2004/0073569 A1 | 4/2004 | Knott et al. |
| 2004/0073919 A1 | 4/2004 | Gutta et al. |
| 2004/0076936 A1 | 4/2004 | Horvitz et al. |
| 2004/0088303 A1 | 5/2004 | Elder et al. |
| 2004/0088730 A1 | 5/2004 | Gopalan et al. |
| 2004/0103092 A1 | 5/2004 | Tuzhilin et al. |
| 2004/0116067 A1 | 6/2004 | Karaoguz et al. |
| 2004/0122686 A1 | 6/2004 | Hill et al. |
| 2004/0148275 A1 | 7/2004 | Achlioptas |
| 2004/0167814 A1 | 8/2004 | Hawks |
| 2004/0172267 A1 | 9/2004 | Patel et al. |
| 2004/0215733 A1 | 10/2004 | Gondhalekar et al. |
| 2004/0220826 A1 | 11/2004 | Hey |
| 2004/0225577 A1 | 11/2004 | Robinson |
| 2004/0230546 A1 | 11/2004 | Rogers |
| 2004/0254857 A1 | 12/2004 | Onizuka |
| 2005/0021499 A1 | 1/2005 | Bradley et al. |
| 2005/0066350 A1 | 3/2005 | Meuleman |
| 2005/0086300 A1 | 4/2005 | Yeager et al. |
| 2005/0120006 A1 | 6/2005 | Nye |
| 2005/0125309 A1 | 6/2005 | Song |
| 2005/0203807 A1 | 9/2005 | Bezos et al. |
| 2006/0100956 A1 | 5/2006 | Ryan et al. |

FOREIGN PATENT DOCUMENTS

| | | |
|---|---|---|
| WO | WO 01/46930 | 6/2001 |
| WO | WO 02/25937 A2 | 3/2002 |
| WO | WO 02/37840 A2 | 5/2002 |
| WO | WO03/088107 | 10/2003 |
| WO | WO 2004/052010 | 6/2004 |
| WO | WO 2004/053757 | 6/2004 |

OTHER PUBLICATIONS

Patrick Y.K. Chau, et al "Identifying early adopters of new IT products: A case of Windows 95", Information & Management 33 (1998) 225-230.*

The Role of Market Entry Timing in the Evaluation of Manufacturing Technology Innovations Harold Zane Daniel, Jr., Ph.D. Dissertation, University of Connecticut, 1997.*

David R. Fell, et al. "Measuring innovativeness for the adoption of industrial products", Industrial Marketing Management 32 (2003) 347-353.*

Franklin J. Carter Jr. et al. "Technological innovations: a framework for communicating diffusion effects", Information & Management 38 (2001) 277-287.*

Fred W. Morgan, Jr, "Are Early Triers Heavy Users?" The Journal of Business, vol. 52, No. 3 (Jul. 1979), pp. 429-434.*

Beatty, et al. "Factors influencing corporate web site adoption: a time-based assessment", Information & Management vol. 38. pp. 337-354 (2001).*

Adomavicius, Gediminas, et al., "Extending Recommender Systems: A Multidimensional Approach," IJCAI-01 Workshop on Intelligent Techniques for Web Personalization (ITWP' 2001), Seattle, Washington, Aug. 2001, 5 pgs.

Boutilier, Craig, et al., "Online Queries for Collaborative Filtering," believed to be published in *Proceedings of the 9th International Workshop on Artificial Intelligence and Statistics* (AISTAT-2003), 2003, 8 pages.

Dellarocas, Chrysanthos, "Mechanisms for Coping with Unfair Ratings and Discriminatory Behavior in Online Reputation Reporting Systems," *Proceedings of the twenty-first international conference on Information systems*, 2000, pp. 520-525.

Demiriz, Ayhan, "Analyzing Service Order Data Using Association Mining," Technical Report, 5 pages.

Emergent Music Website at: http://www.emergentmusic.com, accessed on Dec. 9, 2004, 16 pages.

Fagrell, H., "IntraNews: A News Recommending Service for Corporate Intranets," believed to be published in *Proceedings of CSCWD 99*, Compenge, France, 7 pages.

Flake, Dr. Gary, "Self-Organization of the Web and Identification of Communities," press release from NEC Research Institute, Mar. 6, 2002, 1 page.

Geyer-Schulz, Andreas, et al., "Comparing Two Recommender Algorithms with the Help of Recommendations by Peers," In O.R. Zaiane, J. Srivastava, M. Spiliopoulou, and B. Masand, editors, WEBKDD 2002 -Mining Web Data for Discovering Usage Patterns and Profiles 4th International Workshop, Edmonton, Canada, Jul. 2002, Revised Papers, Lecture Notes in Computer Science LNAI 2703, pp. 137-158. Springer-Verlag, 2003, 23 pages.

Ghani, Rayhid, et al., "Using Text Mining to Infer Semantic Attributes for Retail Data Mining," *IEEE International Conference on Data Mining*, Dec. 9-12, 2002. Maebashi, Japan, 8 pages.

Goecks, Jeremy, et al., "NuggetMine: Intelligent Groupware for Opportunistically Sharing Information Nuggets," believed to be published in *Proceedings of IUI '02*, ACM Press, 2002, pp. 87-94.

Goldberg, Ken, et al., "Eigentaste: A Constant Time Collaborative Filtering Algorithm," believed to be published in *UCB Electronics Research Laboratory Technical Report* M00/41, University of California, Berkeley, 2000, 11 pages.

Goombah website at: http://goombah.emergentmusic.com, accessed on Dec. 9, 2004, 9 pages.

Guha, R., "Open Rating Systems," Technical Report, Stanford Knowledge Systems Laboratory, Stanford University, CA, USA, 2003, 10 pages.

Kamvar, Sepandar, et al., "The EigenTrust Algorithm for Reputation Management in P2P Networks," In *Proceedings International WWW Conference*, Budapest, Hungary, May 20-24, 2003, 12 pages.

Moe, Wendy M., et al., "Using Advance Purchase Orders to Forecast New Product Sales," Marketing department, University of Texas—Austin, Jul. 2002, 33 pages.

Montaner, Miguel, "Opinion-Based Filtering Through Trust," technical paper, Institut d'Informatica i Aplicacions, Agents Research Laboratory, Universitat de Girona Campus Montilivi, 17071 Girona, Spain, 2002, 15 pages.

Pavlov, Dimitry Y., et al., "A Maximum Entropy Approach to Collaborative Filtering in Dynamic, Sparse, High-Dimensional Domains," In *Proceedings of the Sixteenth Annual Conference on Neural Information Processing Systems (NIPS-2002)*, 8 pages.

Price, Bob, et al., "A Bayesian Approach to Imitation in Reinforcement Learning," believed to be published in *Proceedings of the 20th International Joint Conference on Artificial Intelligence* (IJCAI-2003), 6 pages.

Ramakrishnan, Naren, et al., "Privacy Risks in Recommender Systems," http://computer.org/internet/, IEEE Internet Computing, Nov.-Dec. 2001, pp. 54-62.

Ramakrishnan, Naren, et al., "When being Weak is Brave: Privacy Issues in Recommender Systems;" Technical paper posted on the Computing Research Repository at http://www.lanl.gov/abs/cs.CG/0105028, May 18, 2001, 12 pages.

Rashid, A. M., et al., "Getting to Know You: Learning New User Preferences in Recommender Systems," believed to be published in *Proceedings of the International Conference on Intelligent User Interfaces*, 2002, pp. 127-134.

Robinson, Gary, "KnowledgeKnife a White Paper," Transpose, LLC, grobinson@transpose.com, 2001, 12 pages.

Robinson, Gary, SongSifter, Disclosure from U.S. Appl. No. 60/345,548, filed Oct. 18, 2001, 14 pages.

Schafer, J. Ben, "Chapter 3: Taxonomy for Recommender Systems," found at: http://www.cs.uni.edu/~schafer/courses/189/thesis_ch3.pdf, 31 pages.

Tang, Tiffany C., et al.,"Scaling Down Candidate Sets Based on the Temporal Feature of Items for Improved Hybrid Recommendations," Eighteenth International Joint Conference on Artificial Intelligence, Aug. 9-15, 2003—Acapulco, Mexico, 8 pages.

Vucetic, Slobodan, et al., "A Regression-Based Approach for Scaling-Up Personalized Recommender Systems in E-Commerce," Workshop on Web Mining for E-Commerce, at the Sixth ACM SIGKDD Int'l Conf. on Knowledge Discovery and Data Mining, Boston, MA, Aug. 2000, 9 pages.

Woelflein, Mike, "Database Heroes," Mainebiz, Nov. 25, 2002, vol. 8, No. 24, Portland, Maine, 2 pgs.

Yu, Kai, et al., "Instance Selection Techniques for Memory-Based Collaborative Filtering," in: Proc. 2nd SIAM Int. Conf. on Data Mining (SDM '02), http://citeseer.ist.psu.edu/yu02instance.html, 16 pages.

Yu, Kai, et al., "Probabilistic Memory-Based Collaborative Filtering," IEEE Transactions on Knowledge and Data Engineering, found at: http://wwwbrauer.informatik.tu-muenchen.de/~trespvol/papers/tkde_yu.pdf, Oct. 2004, 13 pages.

http://www.amazon.com/gp/earlyadopter/browse.html/ref=cm_ea_pdp/102-4825329-5718538?categoryID=2&filterID=-1, Mar. 9, 2004, 1 page.

Andrew Chen, "Forecasting Gross Revenues at the Movie Box Office," ECON 482, Econometric Methods, Final Paper, Jun. 4, 2002, 20 pages.

Tal Garber et al., "From Density to Destiny: Using Spatial Analysis for Early Prediction of New Product Success," Marketing Science Institute Working Paper No. 02-106, Feb. 2002, 42 pages.

Nicholas Kushmerick, "Robustness analyses of instance-based collaborative recommendation," believed to be published in *Proceedings of European Conference on Machine Learning* (Helsinki), 2002, 12 pages.

Shyong K. Lam et al., "Shilling Recommender Systems for Fun and Profit," believed to be published in *Proceedings International WWW Conference*, New York, USA, 2004, pp. 393-402.

Steve Lawrence, "Implicit feedback: Good may be better than best," Workshop on Implicit Measures of User Interests and Preferences, Aug. 2003, 47 pages.

Paolo Massa, et al.,"Trust-aware Collaborative Filtering for Recommender Systems," Published in International Conference on Cooperative Information Systems (CoopIS) 2004, 17 pages.

Greg Notess, "Freshness Issue and Complexities with Web Search Engines," http://www.onlinemag.net/OL2001/net11_01.html, Nov. 2001, 5 pages.

Douglas Oard, et al., "Protecting the Privacy of Observable Behavior in Distributed Recommender Systems," Presented at the SIGIR Workshop on Implicit Methods in Toronto in Aug. 2003, 13 pages.

Matthew Richardson, et al., "The Intelligent Surfer: Probabilistic Combination of Link and Content Information in PageRank," believed to be published in *Advances in Neural Information Processing Systems 14*, Cambridge, MA: MIT Press, 2002, 8 pages.

Andrew Weigend, "Analyzing Customer Behavior at Amazon.com," KDD 2003, Washington, DC, 7 pages.

Jie Wu, et al., "Semantic web graph implied by user preferred activities," Workshop on Implicit Measures of User Interests and Preferences, Aug. 1, 2003, 14 pages.

Amazon Early Adopters List, http://web.archive.org/web/20030604040602/http://www.amazon.com/exec/obidos/tg/feature/-/423495, Jun. 4, 2003, 17 pages.

Amazon Game Boy Advance Product, http://web.archive.org/web/20030629184310/www.amazon.com/exec/obidos/tg/detail/B000087H7T?v=glance, Jun. 29, 2003, 10 pages.

Amazon Panasonic Product, http://web.archive.org/web/20030629210353/www.amazon.com/exec/obidos/tg/detail/B00009KXA3?v=glance, Jun. 29, 2003, 6 pages.

Wansink, Brian, Sea Bum Park; "Methods and Measures that Profile Heavy Users" Journal of Advertising Research, v40, n4, p. 61 Jul. 2000.

Non-Final Office Action dated Sep. 10, 2008, issued in U.S. Appl. No. 10/863,743, filed Jun. 7, 2004, 12 pgs.

Final Office Action dated Apr. 27, 2009, issued in U.S. Appl. No. 10/863,743, filed Jun. 7, 2004, 14 pgs.

Non-Final Office Action dated Mar. 16, 2009, issued in U.S. Appl. No. 10/862,929, filed Jun. 7, 2004, 21 pgs.

Non-Final Office Action dated Jan. 8, 2008, issued in U.S. Appl. No. 10/862,929, filed Jun. 7, 2004, 20 pgs.

Non-Final Office Action dated Sep. 12, 2006, issued in U.S. Appl. No. 10/862,929, filed Jun. 7, 2004, 21 pgs.

Final Office Action dated Jul. 22, 2008, issued in U.S. Appl. No. 10/862,929, filed Jun. 7, 2004, 20pgs.

Final Office Action dated Apr. 2, 2007, issued in U.S. Appl. No. 10/862,929, filed Jun. 7, 2004, 19pgs.

Non-Final Office Action dated Oct. 29, 2008, issued in U.S. Appl. No. 10/862,930, filed Jun. 7, 2004, 22 pgs.

Final Office Action dated May 6, 2009, issued in U.S. Appl. No. 10/862,930, filed Jun. 7, 2004, 24pgs.

Non-Final Office Action dated Mar. 4, 2009, issued in U.S. Appl. No. 10/863,642, filed Jun. 7, 2004, 18 pgs.

Non-Final Office Action dated Apr. 28, 2009 issued in U.S. Appl. No. 10/863,742, filed Jun. 7, 2004, 32 pgs.

Non-Final Office Action dated Mar. 28, 2008 issued in U.S. Appl. No. 10/863,742, filed Jun. 7, 2004, 14 pgs.

Non-Final Office Action dated Mar. 4, 2009 issued in U.S. Appl. No. 11/123,415, filed May 6, 2005, 22 pgs.

Non-Final Office Action dated Jul. 12, 2007 issued in U.S. Appl. No. 11/123,415, filed May 6, 2005, 14 pgs.

Chau, Patrick Y.K., and Hui, Kai Lung, "Identifying Early Adopters of new IT products: A case of Windows 95", Information & Management 33 (1998) 225-230.

Daniel Jr., Harold Zane, "The Role of MARKR-Entry Timing in the Evaluation of Manufacturing Technology Innovations", dissertation, University of Connecticut, 1997, 316 pages.

Notice of Allowance dated Oct. 27, 2009 issued in U.S. Appl. No. 10/863,743, filed Jun. 7, 2004, 7 pages.

Final Office Action dated Aug. 24, 2009, issued in U.S. Appl. No. 10/862,929, filed Jun. 7, 2004, 14 pgs.

Notice of Allowance dated Nov. 2, 2009, issued in U.S. Appl. No. 10/862,929, filed Jun. 7, 2004, 14 pages.

Non-Final Office Action dated Nov. 10, 2009, issued in U.S. Application No. 10/862,930, filed Jun. 7, 2004, 29 pages.

Notice of Allowance dated Aug. 20, 2009 issued in U.S. Appl. No. 11/123,415, filed May 6, 2005, 7 pgs.

Final Office Action dated May 23, 2008 issued in U.S. Appl. No. 11/123,415, filed May 6, 2005, 21 pgs.

Final Office Action dated Sep. 16, 2009, issued in U.S. Appl. No. 10/863,642, filed Jun. 7, 2004, 20 pgs.

Non-Final Office Action dated Dec. 8, 2009 issued in U.S. Appl. No. 10/863,642, filed Jun. 7, 2004 (18 pages).

Final Office Action dated Apr. 13, 2010 issued in U.S. Appl. No. 10/863,642, filed Jun. 7, 2004 (16 pages).

Final Office Action dated Jun. 14, 2010 issued in U.S. Appl. No. 10/862,930, filed Jun. 7, 2004 (24 pages).

Final Office Action dated Sep. 14, 2010 issued in U.S. Appl. No. 10/863,742, filed Jun. 7, 2004 (36 pages).

Non-Final Office Action dated Aug. 30, 2010 issued in U.S. Appl. No. 11/123,415, filed May 6, 2005 (5 pages).

* cited by examiner

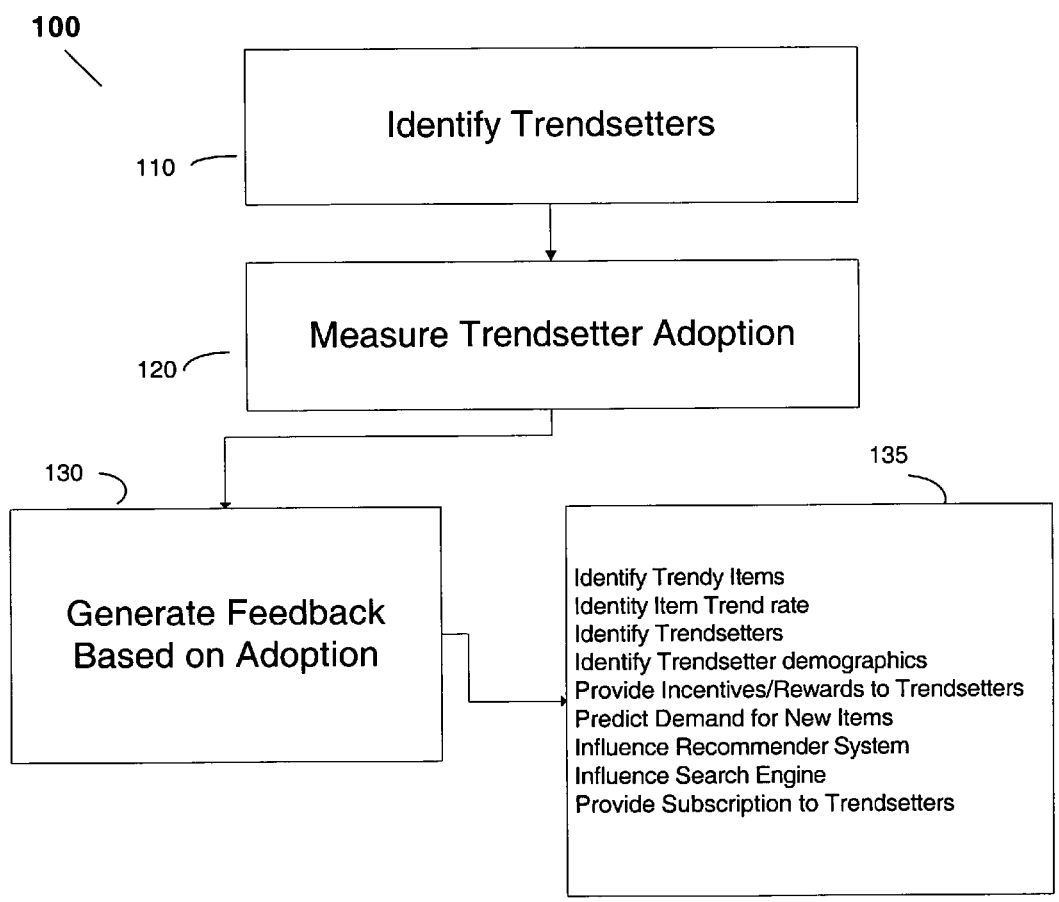

Identifying Trendsetters

FIG. 2B

Subscriber Adoption Tables

| | <Category #1> | | | < Category #2 | | | | > | .... |
|---|---|---|---|---|---|---|---|---|---|
| | 1 | 2 | 3 | 4 | 5 | 6 | 7 | 8 | 9 | |
| A | 5 | 4 | 3 | 1 | 2 | 3 | 0 | 0 | -- | |
| B | -- | -- | -- | 4 | 5 | 3 | -- | -- | -- | |
| C | 3 | 0 | -- | 0 | 0 | 3 | 4 | 5 | 0 | |
| D | 2 | 3 | 0 | 3 | 3 | 2 | 4 | -- | (-1) | |
| E | 1 | -- | 4 | 2 | 0 | 0 | 0 | 0 | -- | |
| F | 3 | 4 | -- | -- | -- | -- | -- | -- | -- | |
| G | -- | -- | -- | 4 | -- | -- | -- | 2 | 4 | |
| ... | | | | | | | | | | |
| ... | | | | | | | | | | |
| .... | | | | | | | | | | |

FIG. 2C

Subscriber Trend Setter Ratings Tables

| | Category #1 | | Category #2 | | .... | | OVERALL | |
|---|---|---|---|---|---|---|---|---|
| | Raw | Norm | Raw | Norm | | | Raw | Norm |
| A | 12 | 4 | 6 | .667 | | | 18 | 18/8 = 2.250 |
| B | -- | -- | 12 | 4 | | | 12 | 12/3 = 4.000 |
| C | 3 | 1.5 | 12 | 2 | | | 15 | 15/8 = 2.125 |
| D | 5 | 1.667 | 16 | 3.2 | | | | 21/8 = 2.625 |
| E | 5 | 2.5 | 2 | .4 | | | 7 | 7/7 = 1.000 |
| F | 7 | 3.5 | -- | -- | | | 7 | 7/2 = 3.5 |
| G | -- | -- | 10 | 3.333 | | | 10 | 10/3 = 3.333 |
| ... | | | | | | | | |
| ... | | | | | | | | |
| .... | | | | | | | | |

Using Trendsetter Data

FIG. 3B

EARLY ADOPTER DETERMINATION PROCESS

| Top N Popular Items | First M Adopters for Item |
|---|---|
| X1 → | $Y_{[X1]}1$ <br> $Y_{[X1]}2$ <br> ... <br> $Y_{[X1]}M$ |
| X2 | |
| X3 | |
| ... | |
| Xi → | $Y_{[Xi]}1$ <br> $Y_{[Xi]}2$ <br> ... <br> $Y_{[Xi]}M$ |
| ... | |
| XN | |

FIG. 3D

Trend Setter Master Set of Adoptions

| Trend Setter | Early Adoptions |
|---|---|
| $Y_{\Sigma MAX}$ | [X1, X2, X3.....] |
| $Y_{\Sigma MAX-1}$ | [X1, X3, X4.....] |
| ... | |
| $Y_{\Sigma MAX-K}$ | [X3, X7, Xi.....] |

FIG. 3C

Trendsetter Rating Table

| Member | Trendsetter Rating | Normalized Trendsetter Rating |
|--------|--------------------|-------------------------------|
| Y1 | $\Sigma 1$ | $N\Sigma 1$ |
| Y2 | $\Sigma 2$ | $N\Sigma 2$ |
| Y3 | $\Sigma 3$ | $N\Sigma 3$ |
| ... | | |
| YP | $\Sigma P$ | $N\Sigma P$ |
| | | |

Trendsetter Raw Ranking Table #1

Member      Trendsetter Rating

| $Y_{\Sigma MAX}$ | $\Sigma MAX$ |
|------------------|--------------|
| $Y_{\Sigma MAX-1}$ | $\Sigma MAX - 1$ |
| $Y_{\Sigma MAX-2}$ | $\Sigma MAX - 2$ |
| ... | |
| $Y_{\Sigma MIN}$ | $\Sigma MIN$ |
| | |

Trendsetter Raw Ranking Table #2

Member      Trendsetter Rating

| $Y_{N\Sigma MAX}$ | $N\Sigma MAX$ |
|-------------------|---------------|
| $Y_{N\Sigma MAX-1}$ | $N\Sigma MAX - 1$ |
| $Y_{N\Sigma MAX-1}$ | $N\Sigma MAX - 2$ |
| ... | |
| $Y_{N\Sigma MIN}$ | $N\Sigma MIN$ |

Adoption Rate and Classification of Members

ITEM CORRELATIONS

| 1 | 2 | 3 | 4 | 5 | 6 | 7 | 8 | 9 | ... | |
|---|---|---|---|---|---|---|---|---|-----|--|
| X | X | X | X | X | X | X | X | X | ... | |
| A | A | A | ... | ... | .. | ... | ... | ... | | |
| B | B | B | H | E | L | K | .... | ... | ... | |
| C | E | F | .... | ... | ... | ... | ... | ... | | |
| D | J | M | N | .... | .... | .... | ... | ... | .... | |
| ... | ... | ... | ... | ... | .... | ... | ... | ... | .... | |
| | | | | | | | | | | |

FIG. 6
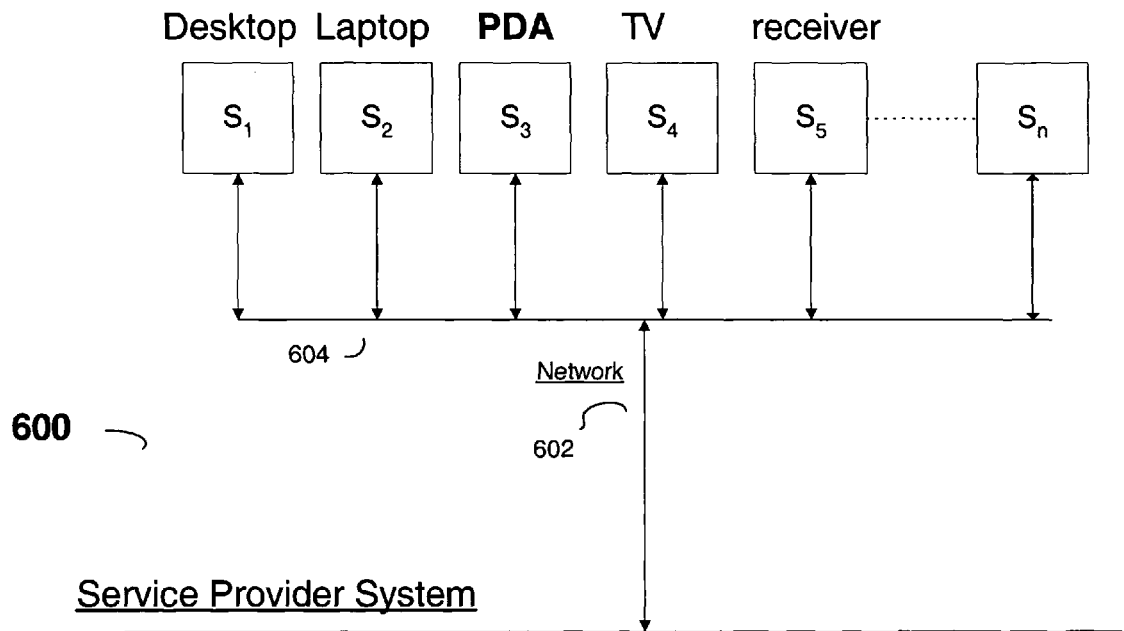
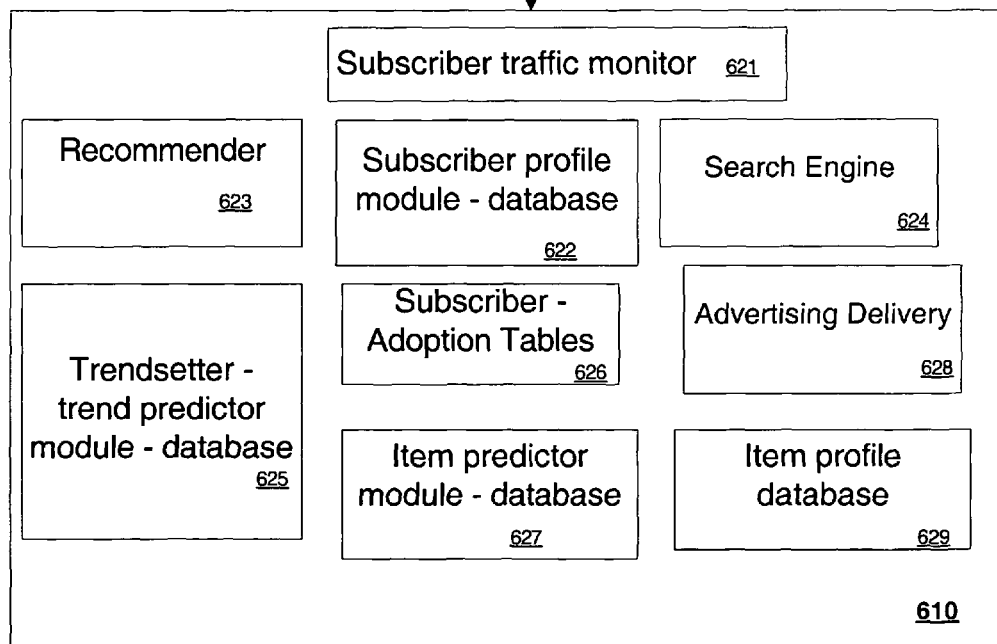

SYSTEM AND METHOD FOR PREDICTING DEMAND FOR ITEMS

RELATED APPLICATION DATA

The present application claims the benefit under 35 U.S.C. 119(e) of the priority date of Provisional Application Ser. No. 60/476,392 filed Jun. 5, 2003, which is hereby incorporated by reference.

FIELD OF THE INVENTION

The present invention relates to identifying and measuring demand for items based on identifying key trendsetter online users and adopters of information, articles and services.

BACKGROUND

The Internet is used extensively now by a growing percentage of the public. At this time, several online websites in fact generate the bulk (if not the entirety) of their revenues from servicing online users and subscribers. These include, for example, companies such as AOL and Yahoo! (content providers), Amazon (books, music, and video recordings), EBay (auctions), Netflix (DVD rentals), Google (search engines) and Doubleclick (advertising) to name a few.

All of these companies monitor the interactions of online users with their websites, and in some cases collect explicit profiling information as well from such users. This is done for the purpose of collecting both individualized and aggregate data, which in turn helps them to better customize the site and overall experience for subscribers, to retain subscribers through personalized interactions, to better target advertising and product recommendations, etc. In some instances the data is logged and later used for data mining purposes, such as for identifying trends (a specific example of this is described in U.S. Pat. No. 6,493,703 which is hereby incorporated by reference) and for giving feedback to recommender systems (i.e. such as with Netflix's Cinematch engine).

A similar concept is illustrated in U.S. patent Publication No. 2003/0004781 to Mallon et al. in which a community "buzz" index can be used to predict popularity, for example, of a particular movie before it is released. This application is also hereby incorporated by reference. Thus, this disclosure specifically mentions the usefulness of monitoring an overall awareness by an online group of certain concepts (i.e., such as the brand name of a product), in order to gauge the potential economic performance of such product later.

A website maintained by Yahoo!—buzz.yahoo.com—(the full URL is not included because of PTO citation restrictions, but can be determined by placing a browser executable suffix) also similarly monitors and tabulates online user content queries/viewings and identifies the same in a so-called "Buzz" score Index that is updated daily and presented for public viewing. This list, in essence, acts as a form of "popularity" identification for certain topics. For example, the list may identify that stories about a particular singer were the most talked about, queried, or viewed.

The Buzz Index by Yahoo! further includes a "Movers" section, which basically identifies people, stories, etc., which experience the greatest degree of change in buzz score on a day to day basis. Thus, for example, a particular celebrity may be identified in a prominent story, and that would elevate such celebrity's "mover" status, even if the overall buzz score was not sufficient to break into the top buzz score index. For further information, the reader is recommended to such website.

Another related system used by Yahoo! is a marketing tool on another website—solutions.yahoo.com—which permits companies to analyze behavior of online users, and determine particular characteristics which may be useful to such company. For instance, in one case, Yahoo! was able to track online behavior and combine it with traditional demographic and geographic information (to arrive at a subscriber profile) for a company that provided moving services. From this data, they then tried to glean what profiling data was suggestive of a high likelihood of such subscriber moving. In this manner, Yahoo! was able to "mine" the profiles and develop better target advertising for the moving company to a more specific audience. It can be seen that this example can be applied to many other fields.

While the aforementioned Yahoo! systems provide useful information, they fail to yield at least one additional piece of information: namely, which groups or subscribers are "trendsetters." In other words, while the Yahoo! Buzz Index identifies the existing top popular concepts, and the concepts which are changing the most at any moment in time, it makes no correlation between the two. That is, from looking at the Buzz Index Score for a particular concept, there is no way for a subscriber to know, which persons or group were the first to be associated with such concept. Similarly, the marketing solutions website is useful for predicting which persons are likely to meet a particular criteria, but does not otherwise identify whether such persons are the first adopters of a particular concept—i.e., such as the first to query/view certain content, the first to buy a particular product, or the first to try a particular service.

This additional piece of information is extremely valuable, because it can be used in a variety of ways to improve an e-commerce website as explained in further detail below.

SUMMARY OF THE INVENTION

An object of the present invention, therefore, is to overcome the aforementioned limitations of the prior art;

Another object is to provide a system/method for identifying trendsetters, both within and outside an electronic community;

A related object is to provide a system/method for analyzing the behavior and effects of trendsetters both within and outside an electronic community;

Another object is to provide a system/method for analyzing the behavior and effects of other members within and outside an electronic community, including trend laggards, and trend rejecters;

Still another object is to provide a system/method for testing, rating and reporting on an adoption rate and/or expected demand for a particular item, both within and outside an electronic community;

A further object is to provide an automated system/method for customizing and determining the effects of particular types of advertising on different types of members within an electronic community;

Yet another object is to provide certain types of recommender systems, search engines system, and a content presentation systems, which take into account the adoption behavior of participants using such systems;

Another object is to provide a system/method for calculating and quantifying the existence of trend predictor items within member adoptions, which items are useful as markers for the potential success of other items within a member's list of adopted items.

A first aspect of the invention concerns a system and method of identifying trendsetters within an online community for items available to members of the online community, the method comprises the steps of: identifying adoptions of a first item made by members of the online community; ranking the adoptions of the first item to identify and provide trendsetter ratings to members who are early adopters of the item; and repeating steps (a) and (b) for a plurality of second items. The early adopters of the first item can also be early adopters of one or more of the plurality of second items. An ordered list of trendsetter members based on the results of step (c) and the trendsetter ratings for the first item and the plurality of second items is then generated. The items of interest can be a product, a service, content, a market security, etc.

In preferred embodiments, the trendsetter rating is scaled in accordance with an adoption rank achieved by a member. Furthermore, the list of trendsetter members can be published online for viewing by other members of the online community. The list of trendsetter members is used to identify members entitled to incentives and/or rewards from an operator of a website for the online community.

In some applications, members of the online community can elect to subscribe to activities associated with selected trendsetter members, so that later adoptions by the selected trendsetter members are communicated to such members.

For other preferred embodiments, an additional step of identifying members who are trend predictors from the trendsetter members is performed, as well as measuring a prevalence rate among the trend predictors for a newly introduced item. In addition, a change in prevalence rate among the trendsetters for a newly introduced item can also be measured, along with popularity prediction ratings for newly introduced items. The trendsetters can be members of a separate online community.

In some embodiments, a recommendation is automatically generated to a member of the online community for an item by examining items that are prevalent among the trendsetter members.

In other embodiments, a set of profiles for the trendsetter members can be provided to an e-commerce vendor and/or advertiser. Other steps of monitoring online viewing, query and related interaction behavior exhibited by members of the trendsetters can also be performed.

Another aspect of the invention concerns a method of identifying trend predictors within an online community. The method comprises the steps of: identifying adoptions of a first item made by members of the online community; ranking the adoptions of the first item to identify and provide a trendsetter rating to members were early adopters of the item; repeating steps (a) and (b) for a plurality of second items; the early adopters of the first item can also be early adopters of one or more of the plurality of second items; generating a list of trend predictor members based on the results of step (c), the trendsetter members being those members who score highest overall for a trendsetter rating across the entire online community for the first item and the plurality of second items. The trend predictor members are derived from examining the first K members who in aggregate first adopted all of a set of M separate popular items.

In preferred embodiments, the trend predictor members are used to generate a prediction for a popularity of a newly introduced item. The prediction is based on measuring a prevalence rate for the newly introduced item at a first time after introduction of such item. The prediction is further based studying a change in the prevalence rate at a second time after the first time.

In other applications a further step of generating online advertising tailored to the trend predictor members is performed. In other embodiments, one or more proxy accounts are set up based on the trend predictor members, to observe a behavior of one or more online websites towards the one or more proxy accounts.

Still another aspect of the invention concerns a method of electronically identifying trendsetters within a subscriber population. The method comprises the steps of: identifying a behavior and/or action which is relatively prevalent within the subscriber population; identifying early adopters within the subscriber population of the behavior and/or action by monitoring their activities during an electronic data collection session; and repeating steps (a) and (b) to compile a list of overall early adopters within the subscriber population for a plurality of behaviors and/or actions.

The early adopters can be subscribers to content programming service, subscribers of a communications service provider, purchasers of a software product, purchasers of a media product, such as a book, a movie, and/or a song, bidders in an electronic auction, purchasers of one or more securities traded in a public market, consumers of content presented at an online content service provider, online participants in an electronic auction, etc.

Another aspect of the invention concerns a system with software modules adapted to implement the methods above.

A related aspect of the invention concerns a method of identifying demand by an online community for a particular item, the method comprising the steps of identifying early adopter members of the online community, which early adopter members are characterized by a demand behavior for items which leads and is imitated by other members of the online community; and measuring an acceptance value for the particular item by such early adopter members of the online community.

In some embodiments, an additional step is performed of generating a demand score identifying a predicted overall remaining demand for the particular item. The demand score reflects a predicted overall remaining demand for consumers of the particular item outside of the online community.

Still another aspect is directed to a method of identifying demand by an online community for a particular item, the method comprising the steps of: identifying late adopter members of the online community, which late adopter members are characterized by a demand behavior for the particular item which lags other members of the online community; measuring an acceptance value for the particular item by such late adopter members of the online community; generating a demand score identifying a predicted overall remaining demand for the particular item. In some embodiments, a demand score reflects a predicted overall remaining demand for consumers of the particular item outside of the online community.

Another aspect of the invention concerns a method of identifying predicted demand for an item, the method comprising the steps of: identifying a group of trend predictor members within an electronic online community; identifying one or more items rejected by the group of trend predictor members, by monitoring their activities during electronic data collection sessions; and compiling a list of the one more rejected items.

For some applications, a further step is performed of identifying trend rejecter members within the electronic community, the trend rejecters being characterized as members who have adopted a substantial number of the one or more rejected items. An item rejection prevalence rate among the trend predictor members for each of the one or more items is also measured. In some embodiments, advertising can be disseminated to the trend predictor members for at least one selected rejected item followed by a step of measuring any change in an item rejection prevalence rate for the at least one selected rejected item.

Another aspect of the invention concerns a method of identifying potential demand for a new product and/or new service within a market. The method comprises the steps of: identifying one or more products and/or services which are characterized as having achieved substantial economic success within the market; identifying early adopters of the one or more products and/or services within an electronic community; and monitoring the activities of the early adopters during electronic data collection sessions, to determine a prevalence rating of their collective impressions of the new product and/or new service.

For certain preferred embodiments, the last step is performed before the new product and/or new service is introduced into the market. In other embodiments, a further step of presenting advertising materials to the early adopters is performed, as well as measuring a change in the prevalence rating.

Still another aspect of the invention concerns identifying trend predictor items within a set of items available to an online community. This method comprises the steps of: identifying a first item having a relatively high adoption rate; calculating a correlation between the first item and one or more second items which have a relatively low adoption rate; identifying at least one second item which is highly correlated to the first item, and not highly correlated to other of the one or more second items; repeating steps (b) and (c) to identify a first set of first items which have relatively high adoption rates, and a second set of second items which are highly correlated to the first set of first items. This method is useful for discovering interesting and hidden correlations between otherwise disparate items. In some applications, a further step is performed of measuring a correlation of the second set of items to a newly introduced item to generate a prediction of a demand for the newly introduced item.

A related aspect of the invention concerns a system which includes software routines adapted to perform the above demand prediction methods. In some applications the system is embodied in an Internet based sever supporting a website maintained by an e-commerce operator.

Another aspect of the invention concerns methods of influencing behavior of an electronic recommender system. The method comprises the steps of: identifying trendsetters, the trendsetters being individuals who are characterized as relatively early adopters of items that later become relatively popular within the community of subscribers; measuring an adoption rate by the trendsetters for a particular item; and modifying recommendations provided by the recommender system for items, including the particular item, based on a value of the adoption rate.

A further aspect of the invention is directed to a method of influencing behavior of an electronic recommender system, comprising the steps of: identifying trendsetters, the trendsetters being individuals who are characterized as relatively early adopters of items that later become relatively popular within the community of subscribers; measuring a trendsetter rating for a particular item provided by the trendsetters; and modifying a user rating for the particular item for other subscribers based on the trendsetter rating. The trendsetter rating is used as part of generating recommendations for items to a user requesting a suggestion from the electronic recommender system. In some applications the trendsetters are associated with web pages on the Internet.

A system for providing recommendations of items of interest to a community of online subscribers includes software modules for performing the above steps.

A further aspect of the invention is directed to influencing behavior of an electronic World Wide Web (WWW Internet search engine, which method comprises the steps of: compiling a set of trendsetter web pages, the set of trendsetter web pages being groups of one or more web pages characterized as relatively early adopters of items that later become relatively popular within an electronic community; measuring a trendsetter rating for a first search item identified in the trendsetter web pages; responding to query from a user for search items at least in part based on the trendsetter rating for the first search item. The items can be uniform resource locators (URLs), electronic documents, hypertext links to electronic documents, products, services, multimedia content, etc.

Still another aspect of the invention concerns a method of classifying World Wide Web pages, comprising the steps of: identifying a set of WWW pages; and extracting a set of early adopter WWW pages from the set of WWW pages, which set of early adopter WWW pages are determined by ranking the set of WWW pages in accordance with a time in which they first make a reference to a predetermined set of items.

A further aspect of the invention concerns a method of influencing behavior of an electronic search engine system, which search engine is used for providing results to queries initiated by a community of online users of the World Wide Web, comprising the steps of: identifying trendsetter web pages, the trendsetter web pages being characterized as relatively early presenters of content related to items that later become relatively popular as measured by interest demonstrated by online users for such items; measuring a trendsetter web page rating for a particular item; and modifying a search result provided by the search engine to an online user based on the trendsetter web page rating. The trendsetter web page rating is used, at least during certain time periods, for influencing which search results are presented to a user query.

A related aspect of the invention concerns a method of presenting advertising comprising the steps of: measuring an adoption behavior for items exhibited by a first member of an online community during data collection sessions; ranking the adoption behavior against adoption behavior of other members of the online community; and dynamically adjusting advertising presented to the first member during a later online session based on the adoption behavior.

Another aspect of the invention is directed do a method of presenting advertising to an online community, comprising the steps of: processing member historical records of content reviewed and/or items purchased for each member of the online community, and comparing such member historical records with other member historical records; identifying a first member as having a trendsetter status when the results indicate that such first member exhibits behavior which is imitated by other members; interacting with the first member during an online session; and adjusting advertising presented to the first member during the online session based on whether the first member has a trendsetter status.

Yet another aspect concerns a method of presenting advertising to an online community, comprising the steps of: processing member historical records of content reviewed and/or items purchased for each member of the online community, and comparing such member historical records with other member historical records; identifying a first member as having a trendsetter status when the results indicate that such first member exhibits behavior which is imitated by other members; providing a recommendation to the first member within a first screen during an online session using a recommender system; and adjusting advertising presented to the member in the first screen based on whether the first member has a trendsetter status.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. Furthermore, while the inventions are presented the context of certain exemplary embodiments, it will be apparent to those skilled in the art that the present teachings could be used in any application where it would be desirable and useful to identify the existence and behavior of trendsetters.

DESCRIPTION OF THE DRAWINGS

FIG. 1 is a flow chart illustrating the steps performed by a trendsetter evaluation and feedback process implemented in accordance with one exemplary embodiment of the present invention;

FIG. 2B is a depiction of a portion of a trendsetter evaluation matrix used by a trendsetter identification process implemented in accordance with one exemplary embodiment of the present invention;

FIG. 2C illustrates a table generated by an exemplary calculation procedure associated with the trendsetter evaluation matrix of FIG. 2B;

FIG. 3B illustrates a set of trendsetter ratings tables generated in accordance with one exemplary embodiment of the present invention;

FIG. 3C illustrates part of a procedure for determining an appropriate size for a set of trendsetters;

FIG. 3D is a flow chart illustrating the steps performed by an item popularity/demand prediction engine implemented in accordance with one exemplary embodiment of the present invention;

FIG. 6 illustrates a preferred embodiment of a trendsetter identification system 600 constructed in accordance with the present invention.

DETAILED DESCRIPTION

Figure 2A:
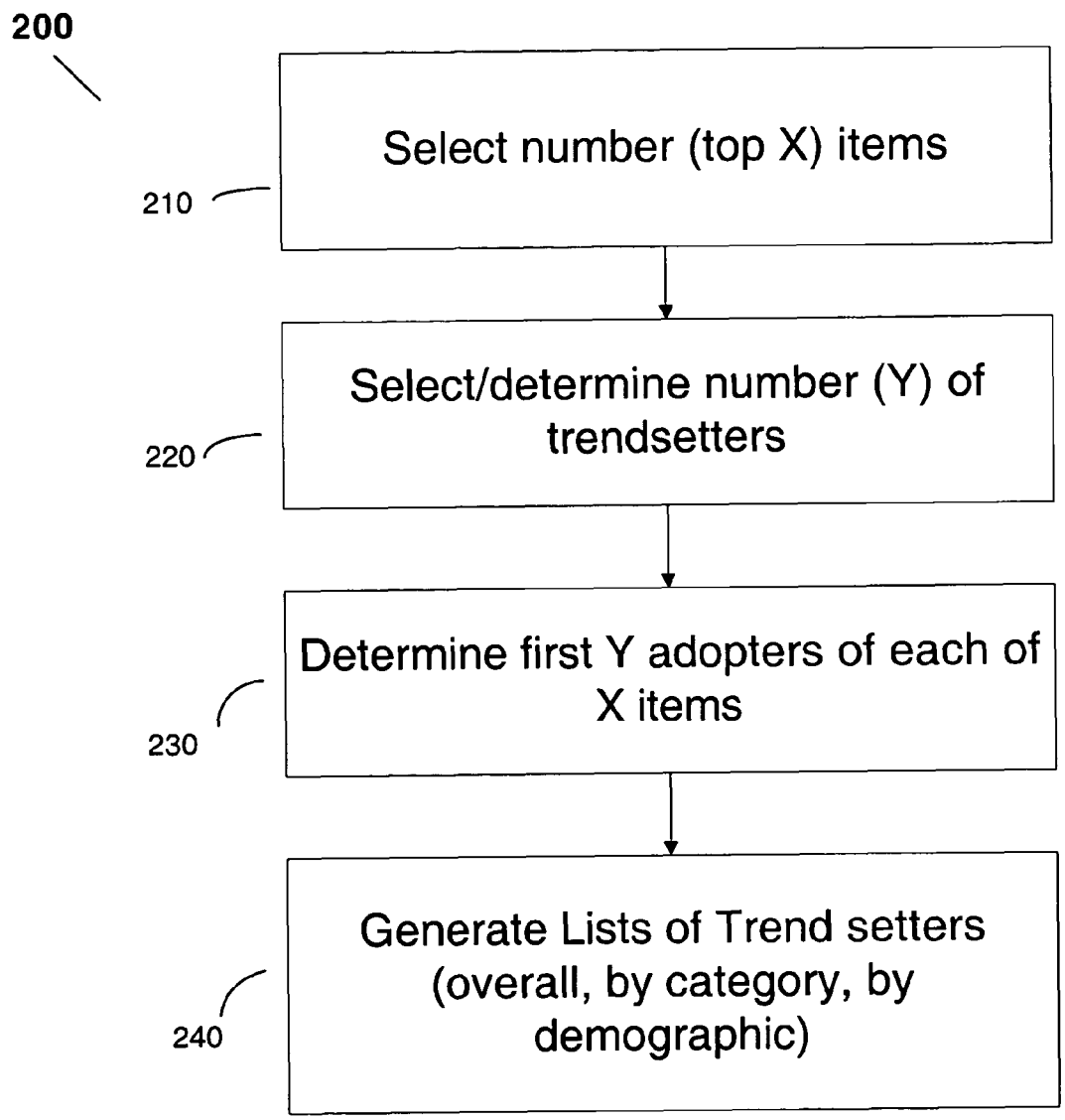
FIG. 2A is a flow chart illustrating the steps performed by a trendsetter identification process implemented in accordance with one exemplary embodiment of the present invention.

The present invention is generally directed, as noted above, to the identification of persons (or even other non living entities whose behavior can be studied) that behave or can be characterized as "trendsetters." In this respect, the term "trendsetter" as used herein is intended generally to mean those persons who have behavioral tendencies, affinities, or opinions about items which tend to be ahead of their peers— at least from a time perspective.

Thus, trendsetters are generally persons whose behavior, beliefs, tastes, actions, etc., are imitated and copied by other persons, and/or are simply slightly ahead of the curve so to speak against other persons. They act as indicators of the paths that others will take. In some instances persons will be considered trendsetters by virtue of their status within a community, such as the special status afforded to celebrities. These persons will naturally serve as trendsetters because their behavior, beliefs, biases, taste, actions, etc., are widely publicized for consumption, and are thus widely imitated by other person.

In other situations, however, persons may behave as trendsetters without knowing the role they are fulfilling, and simply because they have a form of cultural antenna in tune with the zeitgeist. For example, early adopters of a particular new type of computer can be seen to be a form of trendsetter. Persons who are the first to look for, read and/or spot particular new content (i.e., news stories) can also be trendsetters. Many more examples will be apparent to those skilled in the art, and as used herein the term is intended to be interpreted in its broadest sense consistent with this disclosure.

Accordingly, in a preferred embodiment describe below, the behavior that is being monitored is the adoption of a particular item by a person, group or entity in a time fashion that precedes and anticipates the later actions by peers. Nonetheless it will be understood that other aspects of a trendsetter's behavior, beliefs, biases actions, etc., could also be imitated, copied and studied. For instance, it could extend to the bidding behavior of an online auction participant, or the particular interface personalizations selected by some subscribers for their interactions with a website, or the nature of the queries they present to a search engine at an online website.

In other cases, for example, the non-action, rejection or non-adoption of an item by a trendsetter may serve as a basis for imitation and study for identifying trendsetters, such as in the case where a person consistently rejects a particular item in a head to head comparison against other items. The present invention, therefore, can also be used to calculate rejection prevalence or a rejection rate of an item by a group of trendsetters.

As can be seen from the present disclosure the present invention is primarily concerned with "useful" trendsetters, meaning those persons whose adoptions end up becoming sufficiently popular or imitated within a large enough community. The degree of popularity, and the size of the community can be extremely variable of course, but the point is to exclude "early" adopters who have impulsive, indiscriminate behaviors (i.e., buy anything new). Such persons do not communicate useful information in the sense that their behavior is not sufficiently predictive of a future trend.

Conversely, persons whose behavior tend to behind the general population, or can be considered as late adopters of an item, can be generally described as "trend laggards." As explained below, identifying and monitoring trend laggards can also be useful in some contexts. Thus when the term "trendsetter" is used below, it will be understood that it could also refer to a trend laggard as well, except where it is apparent to one skilled in the art from the context that such is not logical and/or consistent with the present description.

Further as used herein, the term "item" is also intended in its broadest sense, and my refer, for example, to a product (books, auction articles, music recordings, and the like) a service, a human readable content piece (an online news story, video, comment, a web page, a website, an interface customization, etc. The item could even refer to a more abstract concept, such as a person, a security, an opinion, a belief, etc. Basically, the term can refer to anything which can be accurately measured in connection with a group of individuals or entities, including persons within an online community, websites associated with particular subject matter, etc.

It should be noted that the trendsetters identified by the present invention may or not be drawn from the community under consideration. In other words, it is entirely possible that the existence and behavior of trendsetters within one community can be used as a useful gauge for determining the expected demand for an item in an unrelated community. For example, the consumption of ads by a particular set of persons within a particular electronic community might be a sufficiently useful proxy for predicting the behavior of a different set of persons expected to view such ads in a different medium (i.e., television.) The predictions of a stock price by one or more trendsetters may be used to anticipate the performance of a stock within a trading market.

Furthermore, as used herein, a trendsetter could refer to a single person, or to a group of persons having some common characteristic, such as membership in a group, or a particular demographic profile. Trendsetters can also be broken out and characterized by sub-group, and demographic group as may be desired or convenient. For instance, trendsetters may be further classified according to sex, age, or income. In another application, they may be classified according to subgroup.

Thus, even within a single community, one group may have one set of trendsetters for a group of items, while in another group a different set of trendsetters may be identified for such items. This allows for finer differentiation at a level that is more personal. An example of this are the subgroups and communities created by Amazon from its customer base, such as groups of customers from a particular domain, customers from a particular zip code, phone area code, etc. Other examples will be apparent to those skilled in the art.

In some instances, a non-human entity could be used as well, if such entity's behavior can be meaningfully compared against other entities. As an example, the invention could be used to determine which companies are leaders in using certain types of terminology in press releases, product descriptions, etc. Even web pages or websites can be examined for trendsetter status in some cases.

Finally, even items themselves can be characterized as forms of trendsetters for reasons set out further below, if they provide useful statistical predictive value on other items. Other examples will be apparent to those skilled in the art, and thus it should be appreciated that the invention is not limited in this respect.

Finally, while trendsetters in the preferred embodiment are identified by way of their adoptions of items, this is not the only mechanism that can be used. For example, a trendsetter may be determined with reference to other indicia, such as implicit and explicit inputs. In other words, it is not only adoptions that may signify a trend setter.

The reasons why trendsetters are important are many, and include generally the following:

(1) Members of an online community generally like to be identified and appreciated for their contributions. The invention provides a positive label for their activities and increases the likelihood that they will share personal information that can be used by a website operator;

(2) Other members of the online community like to be kept informed of new trends (i.e., trendy items) and who is associated with such trends;

(3) Larger collections of members (i.e. such as message boards devoted to a topic, online groups associated with particular topics, etc.) can also be analyzed and classified as trend setters within a larger subscriber population. For example, a number of Yahoo! Message Boards, and/or Yahoo! groups could be studied to determine which of such boards or groups is a trendsetter on a particular topic. These boards and groups can then be identified online for the benefit of other members, so that they can determine where to go for learning new trends.

(4) Members of the online community can voluntarily "subscribe" to a trendsetter (person or group), and thus gain the benefit of the latter's early prescience concerning the popularity of items;

(5) By measuring the acceptance or adoption prevalence, or adoption rate of an item by a set of trendsetters, a supplier of the items can better gauge expected demand or potential for the item;

(6) The degree of adoption by trendsetters can be measured and used to influence a recommender system. It is well known, for example, that collaborative filtering systems suffer from "first rater" problems, and thus the present invention can be used to influence and bias a recommender system by disproportionately weighting the selections of certain individuals at an early stage to accelerate the learning of the CF system;

(7) The profiles, demographics, etc. of trendsetters can be gleaned by outside entities and used for advertising/marketing purposes, in the same manner as used by the aforementioned Yahoo! solutions program;

(8) Since trendsetters are some of the most valuable assets of an online community, identifying them early allows a website operator to provide them with inducements and rewards to stay within the online community;

(9) Product marketing/sales statistics can be determined from studying the trendsetters, including an overall trendsetter adoption percentage, adoption prevalence, adoption rate, as well as benchmark comparisons to prior popular items;

(10) Trendsetters can also be used for influencing the score of a search engine. It is well-known that some search engines use a form of relevance scoring in presenting search results. By weighting items associated with trendsetters (which can be items adopted by persons, or individual sites that are rated as trendsetters among other websites) more highly, this can further serve to improve the performance of such systems.

(11) Other preferences of trendsetters can be explored and presented for public viewing, such as personalization features and functions they may use at content provider sites, including content categories they review, websites they visit, and interface customizations that they use.

These are but a few reasons why identifying trendsetters are an extremely useful process, and others within the scope of the present invention will become apparent to those skilled in the art from the present disclosure.

FIG. 1 is a flow chart illustrating the steps performed by a trendsetter evaluation and feedback process 100 implemented in accordance with one exemplary embodiment of the present invention. As described herein, such process (as well as the other processes explained below) can be embodied and expressed in a variety of software programs, routines, etc., that run on one more client or server devices coupled to the Internet, using techniques that are well known in the art. The types of systems which can embody the present inventions can include a variety of conventional hardware platforms known in the art, including data processing equipment and computers with a wide range of computing/storage resources and capabilities. Accordingly, the details of such software and hardware implementations are not material except as discussed herein with reference to specific aspects of the invention, and they will vary significantly from application to application based on a desired performance.

As noted in FIG. 1, a first step 110 is to identify the trendsetters, which, as noted above, preferably will be from within a particular online community, but need not be. For example, an online community might consist of all subscribers to Amazon, EBay; Netflix, etc., or those users who frequent Yahoo!, Google, etc. Alternatively, the trendsetters could be determined by reference to a sub-group, if the overall online community population is not easily manageable, and/or to make the trendsetter identifications more relevant to particular categories of users. A preferred process of identifying the trendsetters is explained in more detail below, using a variety of electronic data collection techniques.

At step 120 the adoption prevalence (and/or adoption rate) for one or more items is measured for the trendsetters. Generally speaking, these particular items represent newly introduced items to the online community, so that they are not already adopted by a large percentage of the online community members. Again, a preferred process of identifying the adoption prevalence (and/or rate) is also explained in more detail below.

During step 130, after determining the adoption prevalence, a variety of different reports, feedbacks, responses, etc., can be generated based on a value of the measured adoption prevalence. This includes, for example, the options identified at 135, and which were alluded to earlier.

For instance, a website operator could generate a list of "trendy" items based on an identification of new items which have achieved a particular adoption prevalence (or adoption rate) by the trendsetters. The trendsetters themselves could also be identified, typically by their online handles. The aforementioned options include, of course, publishing such data for online consumption by other members of the community, in a manner similar to that done by buzz.yahoo.com. The percentage of trendsetters who adopt over time, as well as comparisons to adoption rates for other items could also be published.

Similarly, a website operator could use the trendsetter data to provide specialized custom reports for particular entities who may wish to see the acceptance rate of a particular new product/service. The entity may be a music publisher, for example, who desires to know the acceptance rate of a particular title. In such case, the music publisher may be able to generate an expected demand prediction for the item by the remainder of the online community, well in advance of the actual demand. This tan assist in accurate and efficient planning for product advertising, manufacturing, shipping, administration, etc.

Alternatively, the invention could be used in a manner similar to that described by Mallon et al., except that the "buzz" measurement could be made only of the identified trendsetters, instead of the random categories envisioned by the Mallon et al. disclosure. Thus, the predicted demand for movies, music, and other entertainment could be predicted by reference to a more reliable data set. Advertisers can also use the present invention to measure the effects of advertising on particular groups, particularly trendsetters.

The website operator could also provide a mechanism for the other online community members to "subscribe" to particular trendsetters, much in the same way as that done at the launch.yahoo.com website. The latter website allows an individual user to be "influenced" by other members, so that the tastes of such members are imposed in the form of musical selections for the user. The limitation of this site, however, is that it does not identify those members who may be trendsetters, so subscribers are not able to glean the status of another member merely by looking at the data for such member. Moreover the Launch site allows a person to be "influenced" by an entire community, as set out in World Application serial no. 02/05140 to Boulter et al (U.S. Ser. No. 09/79,234) incorporated by reference herein. These are useful features, but they do not allow for specific tailoring of musical tastes. Using the present invention, however, an online member can elect to be "influenced" or kept informed of a particular trendsetter's (or a group of trendsetters) selection of items (be they music, products, services, or something else). This feature has the advantage as well of allowing an e-commerce site to achieve more rapid and effective penetration of new items to a community, and before its members potentially hear of such articles at a different site. Again, from the perspective of an e-commerce vendor, it is preferable if they are the first to present new items to persons who frequent their sites, because they run the risk of losing a subscriber or even a potential sale if such person learns of a new item elsewhere.

A similar benefit can be used in connection with a recommender system. Again, recommender systems are well-known and commonly used at e-commerce sites. These systems are known, also, however, to suffer from so-called "first-rater" problems, and this leads to the problem that they do not react very quickly to the introduction of new items or to changes in attitudes by their users. By exploiting the early scouting intelligence provided by trendsetters, e-commerce entities can essentially "tune" their recommender systems (typically based on a collaborative filtering algorithm) very early to substantially reduce this type of problem. In other words, an e-commerce recommender system can be programmed in one implementation to weight the adoptions of trendsetters more heavily than other users, and thus essentially accelerate the learning process for new products. In a collaborative filtering system, the trendsetters could be artificially multiplied and "planted" into different user clusters to influence the recommender system behavior. For an example of the use of "clustering" in collaborative filtering mechanisms in which the present invention could be used, see the recent article by Wee Sun Lee entitled "Collaborative Learning for Recommender Systems" appearing in the *Proc. 18th International Conf. on Machine Learning* (2001) and which is also incorporated by reference herein.

Other techniques for incorporating the teachings and behavior of trendsetters, and mechanisms for influencing the operation of a recommender system will be apparent to those skilled in the art.

Other useful information can also be gleaned from the trendsetter data, including their respective profiles, demographics, other related tastes and dislikes, etc. This information is extremely valuable from an advertising and marketing perspective, since many entities would like to interact and solicit feedback from such types of individuals. If an e-commerce site can effectively identify such individuals, this database can be marketed as a valuable commodity to other entities.

For similar reasons, since trendsetters are valuable assets for an online community, identifying them early allows a website operator to provide them with inducements and rewards to stay within the online community. Furthermore, the present invention can be used to "mine" other online communities for the purpose of locating, verifying and contacting other potential trendsetters for particular items, or categories of items. For example, one or more websites may agree to allow limited inspection of their respective subscriber databases to other websites for the purpose of exchanging useful marketing information. This function, again, can be valuable for increasing the stickiness and appeal of a particular website.

Identifying Trendsetters

FIG. 2A is a flow chart illustrating the steps performed by a trendsetter identification process implemented in accordance with one exemplary embodiment of the present invention. As seen there, a first step 210 examines which items are the most popular within the community at a given time, which may be the present, or some prior date. It should be apparent that the process can be executed to identify trendsetters for a single items, multiple items, or items within a larger logical grouping, such as a category or sub-category of items. For example, an item might be a particular title of a book; a category of books might be logically grouped by artist, genre, publisher, etc.

It should be clear that "popularity" of an item (or items) could be measured by reference to numbers of units sold, a number of units rented, a number of page views, a number of queries, a number of messages, etc., and the degree by which an item is deemed to be popular can be measure in any number of ways, including, for example, a percentage. Thus, in the present example, an item is deemed "popular" when it is among the top 10, or among the top 10% of items. Other applications are likely to use other benchmarks for determining popularity.

In any event, after identifying the set of popular items, the process then calculates a number Y of persons at step 220 that it is going to use and characterize as "early" adopters, or trendsetters. This value, of course, could be changed on an item by item, or category by category basis as needed. The trendsetter number could be generated as a constant (i.e., the first 100 people), or as a percentage of the total who have adopted the item. Furthermore, trendsetters could be characterized on a graduated scale. In the latter case, for example, the first 100 adopters may be given one weight, the second 100 adopters a lower weight, etc., so that multiple levels of trendsetters could be established for an item.

In another instance the value of Y can be gleaned by statistical analysis/prediction. In other words, by studying an adoption prevalence (or adoption rate) for popular items, one skilled in the art can determine experimentally, using varying confidence levels, what the smallest value of Y is required to serve a useful prediction value. This calculation has utility because it is preferable, of course, to reduce the universe of trendsetters to its minimal but still useful value. In some cases the invention can calculate both types of values for the trendsetters: i.e., one calculation for identifying the number Y of trendsetters, and another value Y' for identifying the smallest number of trendsetters that can yield useful predictive information.

Again the specific calculations will vary from application to application, and will be unique to each environment and to the particular needs/interests of an e-commerce site.

At step 230, the process then identifies the actual trendsetters by examining the first Y adoption times of each item in the set of popular items. Again the trendsetters are preferably identified from within an electronic community using a conventional electronic data collection technique, but do not have to be. This is because in some cases, for example, the nature of people's behavior may be such that a first group's individual and collective behavior can be more accurately modeled, tracked, and used for predictive value for a second unrelated group. The latter, for example, may not provide sufficient tracking information that can be meaningfully analyzed.

Finally, at step 240 the trendsetters are explicitly listed by item, by a group of items, or in aggregate across an entire sampling population. These lists can be used as noted below for private use in marketing, planning, and/or they can be published electronically online as well for community consumption. In the latter case a particular community can see who the trendsetters are for a particular item, or who the trendsetters are for a category of items, or who are the overall trendsetters across all items.

A preferred process for identifying trendsetters is depicted in FIG. 2B with reference to a first trendsetter matrix which corresponds generally to a database of records identifying, in the far left hand column, a particular person, and in the adjacent columns the identity of particular items that are available in the database. Each intersection of row and column identifies whether such person adopted (i.e., looked at, purchase, rented, queried, talked about during an electronic data collection session) such item, and, if so, what score they achieved vis-à-vis a trendsetter rating. For example, for person A, he/she has achieved a trendsetter score of 5 for item #1, a score of 4 for item #2, etc. The items are further logically grouped into categories as noted, so that items #1-#3 belong in a first category, while item #4-#9 are in a second category.

The trendsetter matrix is compiled from ongoing loggings of user selections of items, and because of its nature does not have to be performed in real-time. In fact, it may be calculated daily, weekly, or even on a periodic basis for a target set of items as requested by a particular third party to generate customized reports. An example of the usage of such types of matrices, in a related context of examining user ratings of items for a collaborative filtering algorithm, is discussed in an article by Melville et al. entitled "Content Boosted Collaborative Filtering" from the *Proceedings of the SIGIR*-2001 *Workshop on Recommender Systems* (New Orleans, La. September 2001) and which is incorporated by reference herein.

In one embodiment the correlation matrix can include all of the items in an item database, so that as new items are added, some additional predictions can be made about them as explained below. In situations where additional demand type predictions are not needed or desired, the correlation matrix may be composed only of "popular" items as determined from the above.

It is understood of course, that this depiction is a simplification of only of a small section of a person-product correlation matrix which is intended to help in comprehending the present invention. In any actual commercial application, the form of the matrix, the type of data and the size of the same could be significantly different. Nonetheless, even from this simplified depiction, one skilled in the art can appreciate how one or more trendsetters can be identified from the aforementioned matrix.

Accordingly, in FIG. 2C, a table of trendsetter scores is compiled from the trendsetter matrix. The trendsetter scores can be derived for individual items, groups (categories) of items, or even for the entire item set.

Thus, for example, for item #1, Persons A, C and F could be classified as trendsetters, if a threshold value of 3 is specified for the trendsetter score. Again, the rating required to be identified as a trendsetter could vary from community to community, and it is not necessary to use a scale of 1-5; any scale, in fact, which allows for ranking is entirely suitable.

The trendsetter scores are first tallied across all items within a category, and then normalized by the number of items adopted by the person within the category. Some scores and ratings may be adjusted statistically for the following reasons.

First, if desired, users who have adopted over a certain threshold percentage of items may be eliminated statistically to avoid biasing the results. That is, some persons may be simply indiscriminate (albeit also early) adopters, and thus users of the invention might track and eliminate such types of users. Again, the invention can be used to identify users who simply purchase a lot of items as random consumers of everything, not trendsetters per se; the choice of course, can be determined on a community by community basis.

Similarly, persons who have not adopted a sufficient number of items within a category may also be eliminated, to avoid attributing trendsetter status to persons with insufficient track records. Thus, the invention can be used to glean the user's overall behavior and trendsetter rating within a category of items, by examining their behavior over a large enough sample set to reduce random errors.

In accordance with this above, therefore, it can be seen that within category 1, users A and F can be classified as trendsetters using one set of criteria. Persons C and E simply have an overall score that is too low, even as they have adopted a sufficient number of items (2) in this instance. A dash (-) is used to denote that the person has not adopted such item. Even though user D has a reasonably high raw score (5) in category 1, he/she is not characterized as a trendsetter, because their normalized score is (5/3)—i.e., their raw score/ #items rated. Thus, D's purchase of item #3, in which they scored no points, is indicative of their late tendency in some cases, so they are not rated overall high enough to merit trendsetter status. In this manner, the invention further rewards accuracy in the behavior of users in discriminating their item adoptions. Person G has not adopted a sufficient enough number of items to be rated fairly, so they do not qualify in this instance for trendsetter status.

Similarly, in the Category 2 items, persons B, D and G now qualify as trendsetters, based on the same kind of scoring logic as noted above. From the above it can be seen that persons who are trendsetters over one set of items (i.e. person A is a trendsetter in Category 1) may not be trendsetters with respect to a different set of items (i.e., Category 1).

An overall score can also be calculated, as shown in the right hand columns of FIG. 2C. In this instance, users B, F and G are excluded because they have not sampled (or adopted) a sufficient number of items. The highest three scores belong to D, C and A respectively, so they may be identified as overall trend leaders. It can be seen, therefore, that even though C is not a trendsetter at either category level, he/she could still be eligible for overall trendsetter status based on their total aggregate behavior.

Again, the thresholds for scores and items ratings can be varied from the above, and are expected to be adjusted differently from case to case within the scope of the present invention. If desired, different ratings criteria could be used to identify a trendsetter at the item level as opposed to the category level or aggregate level. For example, at the aggregate level, a score greater than 2 may only be required to achieve a trendsetter status. By mining and exploring the data set in this fashion, a large number of interesting and useful trendsetter parameters can be gleaned for a particular population sample.

Trendsetter Analysis to Determine Trend Predictors

Another useful tool for identifying and classifying trendsetters in aggregate across a community is illustrated in FIGS. 3A to 3D. This second embodiment of a trendsetter identification process can be used alone and/or in conjunction with the process described above for the reasons set forth below.

Figure 3A:
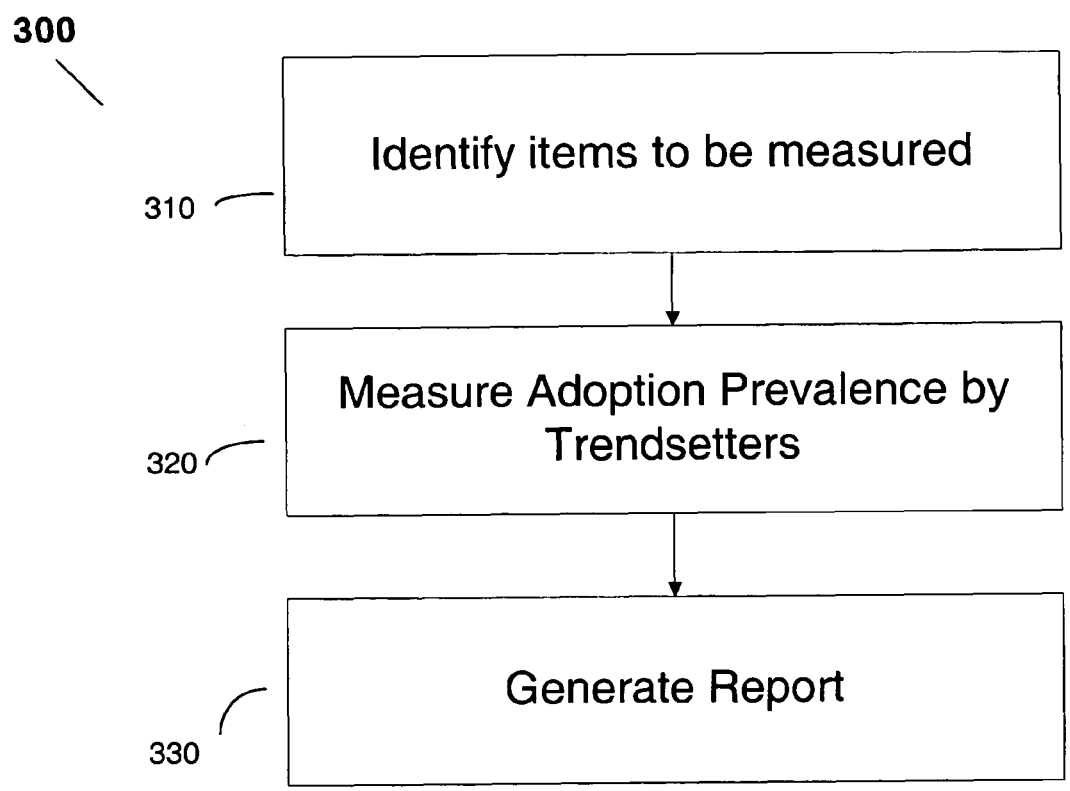
FIG. 3A illustrates the steps performed by an exemplary embodiment of the present invention to determine early adopters of items.

As seen in FIG. 3A, for each popular item (Xi) in the set of N popular items (X1, X2 . . . Xi . . . XN) a determination is made of the first M adopters (Y[xi]1 to Y[xi]M). Again, the choice of N and M are somewhat arbitrary, and are expected to vary from application to application.

A first trendsetter listing table is then created as shown in FIG. 3B. Each item Xi is processed until a table is derived of the entire set of adopters (Y1 to Yp identified in a first column) who qualified as a trendsetter for one more items, along with their aggregate trendsetter scores (in the second column). Since a particular user may be an early adopter of more than one item, his/her score is increased within the list for every such instance. Thus, for example, if a person Y[x1,1] is an early adopter (meaning anywhere within the top M persons) of ten items of the top N items, then they would have an overall trendsetter prediction rating ($\Sigma$) of 10 in the second column of the table of FIG. 3B.

The trendsetter ratings can also be normalized, again, with reference to the total items adopted by the trendsetter under consideration. Thus, as shown in FIG. 3B, the third column in the trendsetter listing table indicates a calculation to denote a normalized trendsetter score (N$\Sigma$).

As an alternative the raw trendsetter scores for a particular item could be scaled in accordance with the degree of "earliness," so that a person could receive a score that is not simply a constant. For instance, if M is 500, a person may receive a score of 10 for being in the top 100 adopters, and a score of only 5 for being between the top 100 and top 500. The person may in fact receive a score equal to his/her actual adoption number within the population. Similar examples will be apparent to those skilled in the art.

Again, as noted earlier, early adopters who have rated too many items, or an insufficient number of items, may be excluded if desired from the tabulation process to arrive at the trendsetter listing table.

In any event, as further shown in FIG. 3B, the set of aggregate trendsetter ratings are then processed from the listing table to generate two ordered trendsetter ranking tables, one by raw score, and one by normalized score. Therefore, as seen in FIG. 3B, Trendsetter Ranking Table #1 is ordered in accordance with those persons who have achieved a highest overall trendsetter score. Conversely, Trendsetter Ranking Table #2 is ordered in accordance with those persons who have achieved a highest overall normalized trendsetter score.

These two sets of aggregate rankings can be used: for a variety of purposes. As a first example, it may be extremely valuable, from a marketing, planning, sales and/or advertising perspective to know which and how many members of a group act as benchmarks and early barometers of popular items. By understanding such groups, an e-commerce entity can begin to make predictions about items that have not yet achieved, but which may eventually achieve great success (prevalence) within a particular online community.

A useful benchmark that can be derived for any community is determining the various confidence levels to predict that an item is likely to achieve great success, based on the number of trendsetters who have actually adopted an item. In other words, another calculation that can be performed in the present invention is a determination of how many of the top trendsetters are needed in order to make predictions about the expected popularity of an item, and correspondingly, how accurate such prediction is likely to be.

The determination of the number of top trendsetters that are needed to generate useful predictions (i.e., so called trend predictors) can be determined experimentally using known techniques.

One basic approach would be to simply take the top K trendsetters using a cutoff that is based on a balance of expediency, accuracy, and performance. The top K trendsetters are then used as proxies and benchmarks below for gleaning the expected behavior of an item, or a group of items, which are not yet popular, but which have been selected by some sub sample of such top K trendsetters.

Another approach for determining K is shown in FIG. 3C, where the actual adoptions of items X1 to XN are listed for the K highest ranking members taken from one of the trendsetter ranking tables. K may be determined, therefore, by examining how many members must be listed before all of items in the set (X1 . . . XN) appear in at least one or more of the individual trendsetter adoptions. Alternatively, K may be selected by examining how many members must be listed before the top 10 (or 20 or 50, etc.) items appear in each of the individual trendsetter adoptions. This latter approach helps to create a very focused and precise set of trends predictors. Yet another approach would be to vary K statistically by examining what benefits (i.e., such as reduction in error—or improvement in prediction) are provided through the incremental addition of another trendsetter as a trend predictor.

Trend Prediction

Nonetheless, the invention is not limited in this respect to any particular selection scheme, and regardless of how K is calculated, preferably a sub sample of the trendsetters are then identified in some form as trend predictors. Again, the trend predictors might be taken from one or both of the Trendsetter Ranking tables in FIG. 3B (normalized or unnormalized), and the final choice may be determined experimentally by examining which subsets tend to give the best results. The trend predictors in the population are then used for generating various forms of reports and predictions for marketing/sales/trend analysis in the following manner.

For instance, a supplier of an item may wish to know what the anticipated adoptions (sales, rentals, views) will be for an item within the online community for planning purposes. By measuring the adoption prevalence of the product among the trendsetters, and more particularly, by the trend predictors, the supplier can determine the likelihood of success of such item, based on the fact that such proxies tend to adopt items very early that later turn out to be very popular. The measurement and prediction for a first item might also be used to trigger introduction of a second related item, if the adoption prevalence appears sufficiently large so as to suggest that the two items will be popular within a particular online community.

The adoption prevalence for an item can be measured in a number of ways. For example, the raw number of instances which such item has been adopted by the trend predictors could be measured. Alternatively, a percentage figure could be determined, as well, to indicate a relative percentage of trend predictors (or trendsetters) who have adopted the item.

For example, in the case of the person-item matrix of FIG. 2B, if item #3 and #9 are new items, their adoption prevalence by the trendsetters can be calculated as follows: for item #3, the adoption prevalence is 50% (since only A has adopted the item, and F has not) while for item #9, the adoption prevalence is 33% (since only D has adopted the item, and B and G have not). This is of course, a simplification, and those skilled in the art will appreciate that actual data sets will be significantly larger, and that other mechanisms could be used to compute such adoption prevalences.

In another variation of the invention, a rejection of an item, to the extent it can be accurately determined, can also be specified as part of the person-item matrix, in the form of a negative number, and in varying degrees. For example, if a user is shown an ad for a particular item, and does not respond positively to such ad in any fashion (i.e., through queries, content viewings, etc.) then the item could be given a negative rating, signifying that it was rejected by that user. If the ad or other offer for the item is rejected again in the future, the negative rating could be increased, up to a maximum limit signifying a (perceived) unconditional rejection.

The benefit of collecting data on rejected items, of course, is that the attitude and behavior of the trendsetters and/or trend predictors towards such items can also serve as valuable marketing and prediction information. The negative ratings, of course, would be ignored during calculations of the trendsetters and trend predictors. Nonetheless, it can be seen quite clearly that the trendsetters can help identify early on both products that are likely to be popular, as well as items that are not likely to be popular.

The adoption prevalence could also be studied over time, to glean other useful trend predictive data, such as an adoption rate. Thus, the trend predictor penetration rate could be examined on a day to day, week to week or other specified time basis to see changes in such rate over time. Again, comparisons could be made to historical data as well for better analyzing the behavior of popular items, and predicting the behavior of a new item. An e-commerce vendor may determine, for example, that only certain rates of adoption by the trend predictors exceeding a threshold are meaningful predictors of the popularity of an item.

For example, in a very simple use of the trend predictors, they can be compiled into a list, and identified to advertisers/market researchers. These entities, in turn, can then target their advertising, surveys, etc. to such trend predictors very accurately to glean valuable insights that would otherwise remain buried on a mountain of aggregate data. For instance, as noted earlier, an identification of the topics and interests of the trend predictors (and/or trendsetters) could be measured using techniques such as described in Mallon et al.

The trend predictors in some instances can serve as facilitators for introducing new popular material into a community, because they tend to lead the remainder of the community. By presenting such new items directly to the trend predictors, the likelihood of success of such item also concomitantly increases.

Finally, in some cases it may be desirable to study the other adoptions of items made by a group of trendsetters (or trend predictors), to see to what extent they also share certain item selection adoptions that are substantially different from the overall population being studied. For example, certain obscure content titles (books, movies, articles) may be viewed with significantly greater frequency by trendsetters as compared to other members of the community. These additional items (or groups of items) can serve as additional forms of fingerprinting and identifying trendsetters and trend predictors in the future at an early stage, even when information may be incomplete for a particular individual.

The overall process 300 for generating item adoption rates and predictions is depicted generally in FIG. 3D. As noted there, a list of new items or items specific to a particular supplier are used at step 310. The adoption prevalence within the trend predictors (or the trendsetters as may be desired) is then measured at step 320. At the end, a report can be made at step 330, to identify trend data for the items. Again, a vendor or other supplier of an item can thus measure, at any moment in time, the behavior and performance of a particular item within a very specific but important segment of the population of the online community.

The benefit of the present invention is also evident as it allows for rapid identification of trendsetters and trend predictors, even from relatively new additions to the community of members. That is, unlike traditional recommender systems which require extensive amounts of data collection, the behavior and classification of a member as a trendsetter can occur fairly early and quickly based on an adjustable number of item adoptions. This makes it possible for new ideas and tastes to be more rapidly integrated and disseminated within a particular community, enriching the experience of other members as well. Furthermore, the present invention helps to minimize the effects of "popularity bias," which is known to cause recommender systems to frequently recommend only items which are already popular throughout the entire community. This is because, as can be seen herein, the influence of certain persons, such as trendsetters, can be weighed at an early stage of an item's adoption to improve its visibility to other members.

In some instances, for example, a content service provider may simply use the trendsetters or trend predictors for providing recommendations for items, in lieu or as a supplement to a traditional recommender system. A "content service provider" (or service provider) in this instance refers generally to an entity that is not directly involved in the creation of new content, but, rather, merely distributes it in some fashion as a service to subscribers.

As alluded to earlier above, in some cases an e-commerce website operator serving an online community may benefit from identifying trendsetters, trend predictors and trend predictions from off-line communities, or even other online communities. This type of process can be automated, as well, as set forth in U.S. Pat. No. 6,571,234 (incorporated by reference herein) based on operator selections to rapidly and automatically inject new materials for consumption by an online community.

Furthermore, as noted above, it is possible to examine and identify smaller "group" or community trendsetters within larger online subscriber lists managed by such entities as Yahoo!, Amazon, EBay, AOL, MSFT, etc., In other words, a content service provider may want to alert and publish lists of particular groups that are trendsetters on particular topics. Thus, for example, an e-commerce entity such as Yahoo! could use the present invention to analyze which message boards or groups were the first to discuss certain types of products, brands, services, etc. These trendsetter groups can be identified, again, for general interest or marketing purposes, on a topic by topic, group by group basis.

In some instances it may be desirable for a first website operator to induce trendsetters, trend predictors, etc., to join a particular community. This can be done by free subscriptions, free services, free products, financial awards, or other similar incentives. By identifying such persons in other online communities and successfully persuading them to contribute to a particular community (even if only indirectly, such as through a recommender system) a website operator can thus boost and improve the overall attractiveness of an online community site.

For other applications it may be possible to imitate the behavior of trendsetters and trend predictors who exist in another online domain. For example, an online community might create a set of proxies who mimic the behavior of another group of persons, in order to obtain the benefit of the input of the latter. The profiles of the proxies could be synchronized on a regular basis to make certain that they reflect current trends.

Moreover, in some cases, it may be desirable to see how an actual trendsetter (and/or trend predictor) from within the community (or even a proxy trendsetter based on a trendsetter from another online community) is treated by various online content providers, again, for the purpose of collecting marketing intelligence. Thus, a first online e-commerce site may create a proxy that imitates a trendsetter from another online community, and then test their own site (i.e., through journaling page views presented to the proxy account, tabulating recommendations made by a recommender system, etc.) with such proxy to see how their site (or other sites) presents itself to such proxy. This technique can be used, for example, to determine if advertising is reaching the appropriate audience.

In another variation of the invention, the trend predictors could be selectors for a particular stock or publicly traded equity. Thus, in a stock picking community, the invention could be used to identify overall successful "early" adopters of successful buy and hold equities for the benefit of other members. For example, some persons may demonstrate that they have a higher degree of prescience in selecting stocks just before they rise substantially (or even decline substantially) in price. When such trend predictors select new stocks in sufficient numbers (i.e., as measured by a prevalence rate) this data could be communicated to the other members to alert them to the newest potential hot pick.

In still another variation of the invention, the trend predictors could be used by an online search engine, such as the type of system used and operated by Google. The latter uses a form of weighting when presenting webpage results to queries, based on a number of links to such webpages. In many respects, the lack of links can be analogized to a lack of ratings in a recommender system; without enough persons being aware of a website, it cannot be linked, regardless of how relevant it may be.

The present invention can address such deficiency in a search context as well, by allowing certain websites, which are likely to be linked to later by a large number of entities because they are trend setters, to be used before such time to render more relevant results. Thus, using the processes noted above, data mining could be performed on entire websites, not just individuals, to determine corresponding website and/or web page trendsetters. In some instances, for example, historical data on the composition and content of websites can be gleaned from online databases, such as the Wayback Machine that is available at archive.org. In other cases a search engine company or trend rater for websites can directly collect content on a regular basis from selected websites in order to rate their trendsetter capabilities. Again, these websites could be identified by topic to search requesters as well as part of a search on a particular search term, so that the latter are made aware of which websites tend to lead the overall Internet in terms of early adoption of material, and thus are likely to have the most "current" information now on subjects, even if they are not the most highly linked to. Thus, in examining hits, the age of a page could be considered as well. The websites could be classified into categories for ease of reference and comprehension.

Thereafter, in response to a particular search query, a search engine could consider the trendsetter rating of a website as part of a weighting algorithm, and the age of a page to present results based in part on the trendsetter status of such website. This additional parameter, therefore, could be used for weighting results, and presenting either a single trendsetter adjusted "hit" list or an additional trendsetter-based results list to supplement a normal search query. The existence and extent of website trendsetters could also be tabulated, compiled and presented for public consumption at search engine websites.

Finally, as noted earlier, the adoption prevalence of certain items (which could be keywords or phrases) can also be studied across a collection of websites to identify the potential for new trends, or the demand for certain items.

In an electronic auction application, such as that maintained by EBay and similar companies, trendsetters are persons who have demonstrated that they can anticipate the expected demand for new types of collectibles that then turn out to be valuable and/or highly in demand. By posting the new activities of such trendsetters (in some cases anonymously, or in aggregate broken down for different types of items) other users can determine what is likely to be a "hot" collectible item in the future, and thus participate at an early stage in the adoption of such items before it becomes too popular, or rises too much in value. The invention is not limited to auctions, of course, and it can be seen that it can easily be extended to other purchasing environments where it is useful to see the behavior of trendsetter buyers/sellers. As noted earlier above, moreover, a prediction can be generated for an auction item, based on demand exhibited by trend setters for such auction item, to determine its potential popularity, and/or to set an initial asking price, to set a reserve price, etc.

Finally, because of the inherent value associated with understanding early adopter behavior, an e-commerce site may charge a subscription fee, or an additional fee, for the privilege of observing such activity. Again, the above are merely examples, and a myriad of other embodiments of the invention will be apparent to those skilled in the art, across a variety of environments which benefit from the identification and use of trendsetters.

Use of Trendsetters for Other Purposes

As alluded to above, in another variant of the invention, the trendsetters can be defined within an electronic community, and yet serve as predictors for events outside of such community—i.e., beyond just the prediction of the likely demand for an item within the community. These events could be associated with sales of products (books, movies, automobiles, recreational equipment, pharmaceuticals, food, content, etc.) or some other article/service. Thus, at step 310 of FIG. 3D the list of popular items may not even be items that are made available to the online community by an e-commerce website operator, but, rather some other item outside the realm of the online community.

For example, in the Mallon et al. application, it is noted that an overall "buzz" for a movie is measured within an online community, and this buzz is used to predict the potential commercial success of such movie in a release to the general public. In a similar fashion, the present invention could be used to measure this same overall "buzz," but within a more defined, focused and meaningful population sample— namely, identified trendsetters within an online community.

To do this in a movie prediction application, for example, the top 100 current movies (in gross receipts or attendance, or some other measure) is specified at step 310. Then, by performing a similar analysis to that noted earlier, a community website operator could determine the first "adopters" of such movie within an online community. This could be done, for example, by examining the dates/times when members first "adopted" the movie, such as by reading an ad about the movie, discussing the movie, or reading an article about the movie. Other techniques for measuring an "adoption" will be apparent to those skilled in the art.

Thereafter the identified trendsetters and trend predictors could be used to predict the popularity of a new movie. The movie could be "introduced" into the online community in the form of one or more ads presented electronically, one or more stories, one or more excerpts, one or more dedicated newsgroups, etc. By measuring the prevalence of adoptions made by trend predictors, the present invention can thus mimic and yet provide a superior prediction to that described in Mallon et al.

The above is just an example, of course, and other techniques and variants will be useful of course for predicting prospective economic activity for other types of products, services, etc. The invention can clearly be extended to other types of predictions for demands for other products and services.

New items can be introduced to an online community (or other population) through a variety of means, including online advertising, and their adoption prevalence then measured among trendsetters and trend predictors. Furthermore, by comparing the changes in adoption prevalence, an advertising entity can measure an effectiveness of an ad or ad campaign, again, in a manner similar to that done by Yahoo!, but on a more useful subgroup.

In yet another variation involving a recommender system, a user-rating matrix for items could be computed based on identifying ratings supplied by trend setters and trend predictors identified through the present invention. It can be seen that the user-trendsetter rating matrix shown in FIG. 2B has a form similar to that described in the user-item rating matrix in the article by Melville et al. above.

The latter suggests using content filtering to populate such matrix when there are no ratings from a user for a particular item, to solve the so-called sparse matrix and first-rater problem. The Melville authors postulate that if the user-rating matrix is fully populated, this leads to better predictions and recommendations. The pseudo ratings used to fill in the user-rating matrix are thus combined with actual ratings from the user to arrive at a recommendation, using what they call a "content-boosted" collaborative filtering algorithm.

In lieu of the pseudo-ratings for items that are based on the user's own selections, a recommender system in accordance with the present invention can use pseudo-ratings for items which are derived from trendsetter or trend predictor ratings for items, or, at least, for relatively new items. The latter ratings, of course, could be gleaned very easily using a basic averaging calculation across the universe of trendsetters or trend predictors who have actually rated the item. The negative ratings, or rejections made by trend setters could also be incorporated.

In this fashion, a trendsetter "boosted" collaborative filtering system can be implemented, instead of using a pure content boosted approach. Moreover it may be desirable, for example, to still use the content-based pseudo ratings from Melville for those items that are relatively old. Thus, a combination or hybrid approach for generating pseudo ratings for a user-item rating matrix can be effectuated using the present invention.

The benefit of such approach is that it has the effect of associating or causing new users to be associated (or artificially neighbored within the user's cluster in a CF sense) with trend setters or trend predictors. This, in turn, means that new items rated by trend setters or trend predictors will be brought to the "conscious" of the recommender system more rapidly, and thus an overall learning rate for new material should correspondingly improve. Furthermore, since trend setters and trend predictors are drawn from a set of persons who tend to mirror the population's overall behavior at a later time, there is little risk in artificially inducing a learning error. Accordingly, based on conventional metrics for evaluating the performance of a prediction algorithm, the present approach should improve a sensitivity and specificity rating, because the pseudo ratings are based on ratings that are likely to be adopted by the new users based on an analysis of historical data (i.e., the predictive value provided by trend setters).

Other uses for trend setters and trend predictors within a recommender system will be apparent from the above, and the present invention is not limited in this respect.

Trend Laggards/Rejecters

Figures 4, 5B:
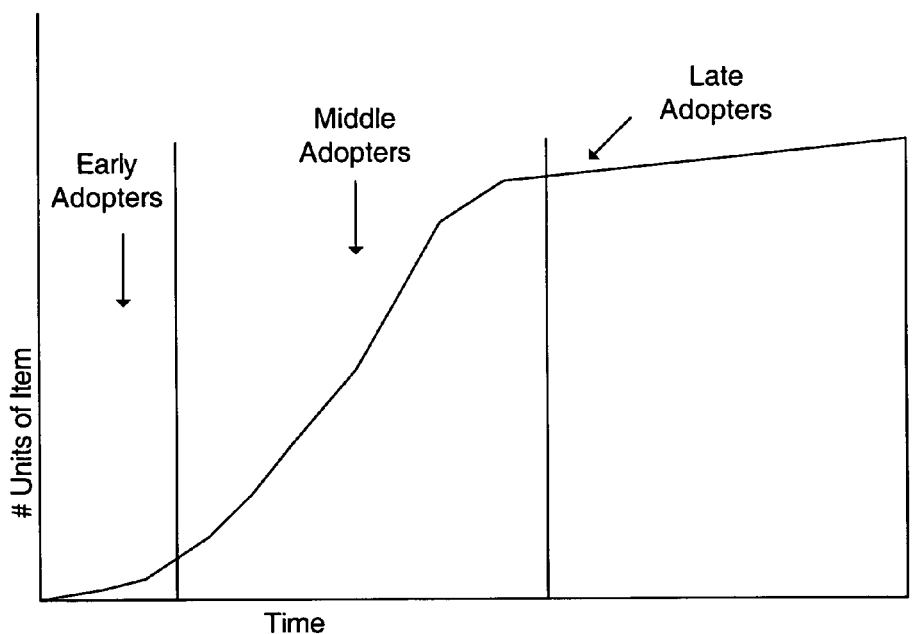
FIG. 4 is a time chart illustrating a typical adoption rate of a new item within an online community, identifying particular regions where subscribers behave as early adopters, middle adopters and late adopters.
FIG. 5B illustrates the basic steps performed by an item trend predictor identification process implemented in accordance with another embodiment of the present invention.

FIG. 4 is a time chart illustrating a typical adoption rate of a new item within an online community, identifying particular regions where subscribers behave as early adopters, middle adopters and late adopters. This last category, which may be described as "trend laggards" may also be useful to identify as well, for a variety of reasons.

First, the prevalence of an item in sufficient quantities within a set of trend laggards may indicate the end of a useful adoption cycle for such item. In other words, the item is likely to not experience further adoption by existing members, and it may not be worth further advertising and/or marketing efforts. Other uses for the trend laggards will be apparent to those skilled in the art. Again, identifying the trend laggards can be done using techniques similar to those described above for the trend setters.

The selection and manner of advertising might also be differentiated to subscribers, depending on whether they are identified as early, middle, or late adopters of items.

Moreover, in a similar fashion it should be apparent that another class of subscribers, who can generally be described as trend rejecters, can be determined by the present invention. Every community will include some percentage of persons who for some reason or another, have attitudes, tastes, behaviors that run counter to the norm, and it may be useful to identify such persons as well. One manner in which they can be determined is by comparing a set of items that are rejected by the trendsetters, and then evaluating which persons in the community tend to rate the rejected trendsetter items highest.

Thus if trend laggards (and/or trend rejecters) can be identified, their contributions or weightings to a recommender system might be adjusted in a similar manner to that provided for trendsetters, except in the opposite manner. That is, trend laggards (and/or trend rejecter) selections or behaviors might be reduced in weighting within a recommender system, as a way of giving better (or more current) recommendations to the average subscriber.

The present invention, therefore, affords a mechanism for identifying and characterizing members in accordance with their adoption times for certain items. Of course, if it is desirable or interesting to look at adoption time frames other than "early" or "late" this can also be done using the present invention to identify such types of persons. It will be apparent to those skilled in the art that the chart of FIG. 4 is merely an example, and that the actual demand curves for a particular item may vary significantly from that shown without deviating from the teachings of the present invention.

Item Predictors

In another variation of the invention, it is possible, in some instances that certain items can themselves act as a type of trend predictor. For instance in traditional content filtering systems, correlations are often made between items, without regard to their characteristics. An example of this is illustrated in commercial recommender systems used by Amazon and TiVo, which, for instance, will recommend a second item based on the user's selection of a first item, based on the fact that two items are often selected together by other users.

These systems thus work in part by using the correlation between two items using a Bayesian algorithm, such that when a person selects A, the system recommends B as well based on the fact that a large number of persons who have selected A also pick B at some point in time. Thus, these types of correlations also provide a degree of behavioral measurement for an online community.

Another way to look at these kinds of correlations is to notice that certain items, even if they are not necessarily popular community wide, can nonetheless act in some instances as predictors for other related items. Thus, for example, an obscure movie title might be highly correlated to a more popular title within the adoption profiles of a large population base. In this respect, therefore, it can be said that the obscure item acts as a type of signature, marker or predictor of the potential for a more popular item. While a single item by itself may not be sufficiently correlated to suggest all by itself that another item is likely to be popular, it is possible to group a sufficient number of obscure items in a fashion that may provide predictive value.

For example, a certain item A may be present 90% of the time with an item X, and have little correlation to any other item, including any other popular item. Note that X is not necessarily highly correlated to A, however. Another relatively obscure item B may have a similar high correlation to item X. A and B may also be highly correlated to other popular items.

Thus if A and B have a very low prevalence rates and yet they tend to be associated with relatively popular items at a rate much greater than other low prevalence items, they can behave or act as a form of trend predictor by virtue of the fact that they lead to the recommendation and/or adoption of popular items.

Accordingly, within a population of online members, suppose that a new product Y is introduced, and A and B both become rapidly correlated with Y. One type of prediction can be made to suggest that Y is also likely to become a popular item as well, since A and B are relatively good markers for predicting the success of items they are related to.

Figure 5A:
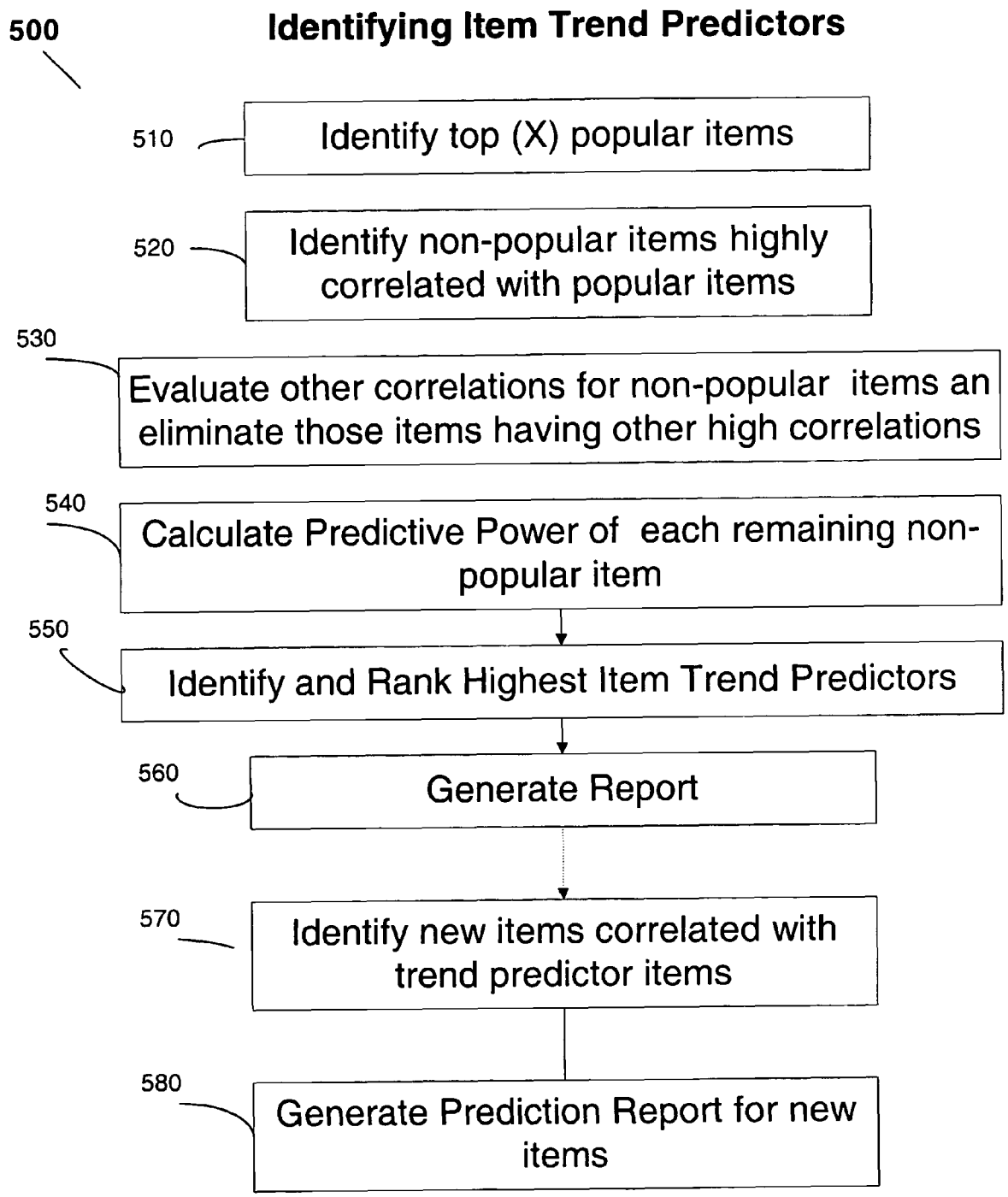
FIG. 5A is a illustrates a correlation/relationship between various items in an online community, such as between certain popular items, and other mote obscure items.

A preferred process for identifying a set of trend predictor "items" therefore is shown in FIGS. 5A and 5B.

In FIG. 5A, a set of items selected by a group of adopters Y1, Y2, . . . etc. is shown. As can be seen there, X is very popular, and both A and B are highly correlated to X, even though the latter enjoys a greater correlation perhaps with other items.

In FIG. 5B, a flowchart is given for the process of identifying trend predictor items. At step 510, a set of popular items is identified, in the same manner as discussed above. At step 520, non-popular items that are highly correlated to popular items are then identified. At step 530, the other correlations of the non-popular items are also examined, to isolate a particular set of items that will serve as useful predictors and markers;—i.e., they are highly correlated to popular items, and not to obscure items.

At step 540, the overall predictive value of the item is calculated, based on examining how many popular items it is associated with, the degree of correlation, and the degree of popularity of the item. Again, the calculation can be based on a matrix type approach as noted above using conventional methods, and normalized as desired to yield a trend predictor value for each of the potential trend setter items.

Thus, at step 550, the set of trend predictor items is created, preferably in an ordered list, so that the top trend predictor items are identified in sequence. A report of the same can be generated at step 560.

The benefit of knowing the set of trend setter items is that they can, of course, be used to some extent to identify trendsetters as well. In cases where an e-commerce operator does not have first hand access to the data selections by particular members, the limited knowledge of the existence of the relatively obscure but meaningful item selections within a user profile can be used to identify trendsetters within another population.

Furthermore, to some extent, the trend predictor items themselves may be useful for conducting another type of item popularity prediction. Thus, at step 570, if items A, B, C are trend predictor items, a search is made for locating new (recent) adoptions in which all (or subsets) of A, B, C are present. Based on these results, a report is generated at step 580 to identify such potentially popular new items.

Again, in some cases it may be desirable to run both types of prediction reports, i.e., based on both trend predictor person ratings, and trend predictor item ratings, to compare the results and see which ones provide more accurate evaluations over time for a particular community. Other variations will be apparent to those skilled in the art.

Other Variations of the Invention

While the preferred embodiment is directed to studies and identifications of trendsetters in online based communities, the present invention is not limited in this respect. A number of other entities and business operations can benefit from the present invention. For example, a service operated by TiVo is known to monitor selections and behavior of its subscribers, by observing their selections as made on a local client device within the subscriber's home. Thus, such service can be used to see which subscribers tend to be good predictors of popular programming, by observing, collecting and tabulating programming selections to identify trendsetters and trend predictors. The trendsetter and trend predictor lists for a content programming service such as TiVo are also valuable commodities which can be sold and exchanged with other commercial entities. It will be apparent to those skilled in the art that the present teachings could be employed in such environments as well, since the data collection for subscribers can be examined in a manner that allows for identification of trendsetters and trend predictors as noted above.

Similarly, a communications service provider (AT&T for example) could use the present invention to observe the behavior of cell phone users, to identify the existence of trendsetters within such population. For instance, such service could monitor which subscribers are the first to use various features offered by the service, such as special calling functions, email functions, etc. This same process could be employed by a number of other consumer and business electronic equipment providers to better glean the demographics, needs and interests of their purchasing base.

In yet another application, the invention could be employed by software vendors to observe and identify purchasers who are trendsetters with respect to the vendors' products. For example, a company such as Microsoft could see which customers are the first to use or exploit new functions and features provided in a commercial software package, or operating system package. A content provider such as Yahoo! could use the invention to monitor which subscribers are the first to look at certain types of contents or online functions that are made available in new releases.

Structure of the Preferred Embodiment

A preferred embodiment of a trendsetter identification and demand prediction system 600 constructed in accordance with the present inventions is illustrated in FIG. 6. The system is composed of several components including a Network 602, through which a number of separate Network Connections 604 are provided to a Service Provider System (preferably a Server Device) 620 by a plurality of Customer Network Devices 612. It will be understood by those skilled in the art that other components may be connected to Network 602, and that not all connections shown need to be active at all times.

There are also several software components and electronic databases associated with the aforementioned network-connected devices, including a Subscriber Traffic module 621, a Subscriber Profile Module/Database 622, a Recommender module 623, a Search Engine module 624, a Trendsetter—Trend predictor database 625, a Subscription Adoption table database 626, an Item predictor database 627, an Advertising Delivery system 628, and an Item profile database 629. Some of these software components of course are essentially the same as those found in a prior art system, except they may be modified appropriately to cooperate with the new software components of the present invention.

Network 602 is preferably the Internet, but could be any implemented in any variety of commonly used architectures, including WAN, LAN, etc. Network Connections 604 are conventional dial-up and/or network connections, such as from analog/digital modems, cable modems, satellite connections, etc., between any conventional network device and an Internet Service Provider in combination with browser software such as Netscape Navigator, Microsoft Internet Explorer or AOL. In a satellite media distribution system implementation, Client Device 612 is a satellite receiver, a TiVo receiver, or the like, and an interface to a service provider does not require a browser.

In most applications, Customer Network Device 612 will be typically desk top computers, laptop computers, personal digital assistants (PDAs), cell phones, or some form of broadcast receiver (cable, satellite, DSL). Server Network Device 610 is typically a network server supporting a service provider website, which, again, may be comprised of a set of logically connected and linked web pages accessible over the Internet. Of course, other structures and architectures may be more suitable on a case by case basis for any particular implementation of the present inventions, and so the present inventions are not limited in this respect.

Software elements of the present invention typically will be custom tailored for a particular application, but preferably will include some common features, including the following.

Operating on System Network Device 610 are the following software routines and/or supporting structures, which implement a form of media distribution.

First, a Subscriber traffic monitor module 621 observes subscriber behavior, including explicit and implicit data input. Thus it logs subscriber activity, such as queries, page views, item adoptions, etc. as noted above.

A Subscriber Profile Module/Database 622 analyzes subscriber inputs, queries, title selections, title deliveries, etc., and forms a customized interest profile for each subscriber. This can be done in using any conventional method. This customized subscriber-specific information is in addition, of course, to any other basic customer-specific information that may be maintained, such as authorized user names, account numbers, physical addresses, credit card information, etc.

Based on such information in a subscriber profile, a Recommender module 623 operates to provide suggestions for items that are likely to be of interest to the subscriber. These can also be provided within a standard query interface presented by a Search Engine module 624. Again, a variety of such types of recommender systems are well-known in the art and can be incorporated within embodiments of the present invention. The item suggestions may be provided while the user is engaged in an interactive session across network 602, or, even while the user is not connected to Service Device 610. The benefit of the latter feature, of course, is that a subscriber delivery queue can be updated even without direct ongoing participation by the user, who may be too busy to engage in a session to locate items. As noted above, Recommender module 623 may generate recommendations that are influenced by the trendsetters and trend predictors in accordance with the discussion above.

A Search Engine module 624 again works in a conventional fashion to retrieve content, materials and results from the service provider site, or other websites, in response to user queries. Profile or cataloguing information for items of interest to the subscribers may be organized in an Item Profile database 629. This item profile information may be searchable by subject matter, category, genre, tide, artist and other attributes as determined by subscriber interests, system administrative requirements, the nature of the item in question, etc. Search Engine module 624 also presents a query interface to subscribers to allow them to peruse and view information about the media items. Again, as noted above, Search Engine module 624 may generate results that are influenced by the trendsetters and trend predictors in accordance with the discussion above.

An Advertising delivery module 628 is responsible for delivering advertising to the subscribers, including the trend predictors, in accordance with the techniques described above. Furthermore, as discussed above, Advertising delivery module 624 may also generate advertising that is directly influenced by the trendsetters and trend predictors in accordance with the discussion above.

A trendsetter—trend predictor module 625 basically functions in accordance with the processes described above in connection with FIGS. 1-4. Based on such operation, a trendsetter—trend predictor database is created to include the type of data noted above as well. The trendsetter database is derived, as noted above, from examining Subscriber Adoption Tables 626. This module is also used, as noted earlier, to generate prediction results for demand for new items as may be requested by the service provider, and to identify trend laggards and/or trend rejecters as may be requested.

Finally, an item predictor module/database 627 operates in accordance with the description given above for FIGS. 5A and 5B.

It will be apparent to those skilled in the art that this is not the entire set of software modules that can be used, or an exhaustive list of all operations executed by such modules. It is expected, in fact, that other features will be added by system operators in accordance with customer preferences and/or system performance requirements.

Furthermore it will be apparent to those skilled in the art that a service provider system implementing the present invention may not include all of the modules/databases as noted above, depending on the needs, requirements or desires of its subscribers, and other technical limitations. For example, many websites do not require a recommender system, because they do not provide such functionality to their subscribers. Thus, the invention is not limited to the preferred embodiments noted above. Finally, while not explicitly shown or described herein, the details of the various software routines, executable code, etc., required to effectuate the functionality discussed above in such modules are not material to the present invention, and may be implemented in any number of ways known to those skilled in the art based on the present description.

It will be understood by those skilled in the art that the above is merely an example of a trendsetter identification and tabulation system/method and that countless variations on the above can be implemented in accordance with the present teachings. A number of other conventional steps that would be included in a commercial application have been omitted, as well, to better emphasize the present teachings.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of identifying demand by an online community for a particular item, comprising:
   compiling, by way of a system network device, a set of N items $\{X_1, X_2, \ldots, X_i, \ldots, X_N\}$,
   wherein for each item $X_i$ amongst the set of N items, a plurality of M early adopter members $\{Y[X_i]_1 \ldots Y[X_i]_M\}$ is determined resulting in N separate sets of M early adopter members, said M early adopter members being determined based on a time of adoption of said item $X_i$;
   determining, by way of the system network device, a set K of the early adopter members that occur most frequently in the set $\{Y[X_i]_j\}$ from N separate sets of M early adopter members, where $1 \leq i \leq N$ and $1 \leq j \leq M$,
   wherein said most frequently occurring early adopter members are classified as trend predictors;
   introducing the particular item for adoption by the K early adopter members; and
   measuring, by way of the system network device, an acceptance value for the particular item by the K early adopter members.

2. The method of claim 1, further comprising:
   using, by way of the system network device, the acceptance value for the particular item by the K early adopter members to predict a demand of consumers outside of the online community for a related item.

3. A method of identifying demand by an online community for a particular item, comprising:
   compiling, by way of a system network device, a set of N items $\{X_1, X_2, \ldots, X_i, \ldots, X_N\}$,
   wherein for each item $X_i$ amongst the set of N items, a plurality of M late adopter members $\{Y[X_i]_1 \ldots Y[X_i]_M\}$ is determined resulting in N separate sets of M late adopter members, said M late adopter members being determined based on a time of adoption of said item $X_i$;
   determining, by way of the system network device, a set K of the later adopter members that occur most frequently in the set $\{Y[X_i]_j\}$ from N separate sets of M late adopter members, where $1 \leq i \leq N$ and $1 \leq j \leq M$,
   wherein said least frequently occurring late adopter members are classified as trend laggards;
   introducing the particular item for adoption by the K late adopter members; and
   measuring, by way of the system network device, an acceptance value for the particular item by the K late adopter members of the online community.

4. The method of claim 3, further comprising:
using, by way of the system network device, the acceptance value for the particular item by the K late adopter members to predict a demand of consumers outside of the online community for a related item.

5. A method of identifying predicted demand for an item, comprising:
identifying, by way of a system network device, a group of trend predictor members within an electronic online community,
wherein the group of trend predictor members are chosen from a group of early adopter members, which are characterized by a ranking of their time of adoption for an item that is among the first in the online community and the item is later adopted by other members of the online community;
identifying, by way of the system network device, one or more items rejected by said group of trend predictor members, by monitoring their activities during electronic data collection sessions; and
compiling, by way of the system network device, a list of the one or more rejected items.

6. The method of claim 5, further comprising:
identifying, by way of the system network device, a group of trend rejecter members within the electronic online community, the group of trend rejecter members being characterized as members who have adopted more than half of the one or more rejected items.

7. The method of claim 6, further comprising:
calculating, by way of the system network device, an item rejection prevalence rate among the trend predictor members for each of the one or more rejected items.

8. The method of claim 7, further comprising:
disseminating, by way of the system network device, advertising to the trend predictor members for at least one selected rejected item; and
measuring, by way of the system network device, any change in the item rejection prevalence rate for the at least one selected rejected item.

9. A method of identifying potential demand for at least one of a new product and a new service within a market, comprising:
identifying, by way of a system network device, at least one product or service which is characterized as being in demand by a majority of an electronic community;
identifying, by way of the system network device, early adopters of the at least one product or service within the electronic community,
wherein the early adopters are characterized by a ranking of their time of adoption for an item that is among the first in the online community and the item is later adopted by other members of the online community; and
monitoring, by way of the system network device, the activities of the early adopter members during a plurality of electronic data collection sessions, to determine a score for their collective impressions of the new product and/or new service.

10. The method of claim 9, wherein the monitoring is performed before the at least one of the new product and the new service is introduced into the market.

11. The method of claim 9, further comprising:
presenting, by way of the system network device, advertising materials to the early adopter members; and
measuring a change in the score for their collective impressions of the new products or new services.

12. A method of identifying trend predictor items within a set of items available to an online community, comprising:
identifying, by way of a system network device, a first item having an adoption rate above a first predetermined level;
calculating, by way of the system network device, a score reflecting the percentage of times the first item and one or more second items having an adoption rate below a second predetermined level are presented together;
identifying, by way of the system network device, at least one second item which has an upper-half score relative to the first item, and has a lower-half score relative to others of the one or more second items; and
repeating the calculating and the identifying to identify a first set of first items that each have adoption rates above the first predetermined level, and a second set of second items that have the correlation score relative to the first set of first items above a third predetermined level.

13. The method of claim 12, further comprising:
measuring, by way of the system network device, a new score of the second set of items relative to a newly introduced item to generate a prediction of a demand for the newly introduced item.

14. A system for identifying demand by an online community for a particular item, comprising:
a software module executing on a computing device, the software module being configured for:
compiling a set of N items $\{X_1, X_2, \ldots, X_i, \ldots, X_N\}$,
wherein for each item $X_i$ amongst the set of N items, a plurality of M early adopter members $\{Y[X_i]_1 \ldots Y[X_i]_M\}$ is determined resulting in N separate sets of M early adopter members, said M early adopter members being determined based on a time of adoption of said item $X_i$;
determining a set K of the early adopter members that occur most frequently in the set $\{Y[X_i]_j\}$ from N separate sets of M early adopter members, where $1 \leq i \leq N$ and $1 \leq j \leq M$,
wherein said most frequently occurring early adopter members are classified as trend predictors;
introducing the particular item for adoption by the K early adopter members;
storing profiles for the early adopter members in a trendsetter database; and
measuring an acceptance value for the particular item by the K early adopter members of the online community.

15. The system of claim 14, wherein said computing device is an Internet based sever supporting a website maintained by an e-commerce operator.

16. The system of claim 14, wherein the particular item is a product.

17. The system of claim 14, wherein the early adopter members are web pages.

18. The system of claim 14, wherein the early adopter members are extracted from purchasing records of individuals having a common geographic demographic.

19. The system of claim 14, wherein the members of the online community are ranked by adoption date for items to identify the early adopter members.

20. A tangible computer-readable storage medium having stored thereon in digital format, computer-executable instructions that, in response to execution by a computing device, cause the computing device to perform operations for identifying demand by an online community for a particular item, comprising:

compiling a set of N items $\{X_1, X_2, \ldots, X_i, \ldots, X_N\}$, wherein for each item $X_i$ amongst the set of N items, a plurality of M early adopter members $\{Y[X_i]_1 \ldots Y[X_i]_M\}$ is determined resulting in N separate sets of M early adopter members, said M early adopter members being determined based on a time of adoption of said item $X_i$;

determining a set K of the early adopter members that occur most frequently in the set $\{Y[X_i]_j\}$ from N separate sets of M early adopter members, where $1 \leq i \leq N$ and $1 \leq j \leq M$, wherein said most frequently occurring early adopter members are classified as trend predictors;

introducing the particular item for adoption by the K early adopter members; and measuring an acceptance value for the particular item by the K early adopter members of the online community.

21. A tangible computer-readable storage medium having stored thereon in digital format, computer-executable instructions that, in response to execution by a computing device, cause the computing device to perform operations for identifying demand by an online community for a particular item, comprising:

compiling a set of N items $\{X_1, X_2, \ldots, X_i, \ldots, X_N\}$, wherein for each item $X_i$ amongst the set of N items, a plurality of M late adopter members $\{Y[X_i]_1 \ldots Y[X_i]_M\}$ is determined resulting in N separate sets of M late adopter members, said M late adopter members being determined based on a time of adoption of said item $X_i$;

determining a set K of the late adopter members that occur least frequently in the set $\{Y[X_i]_j\}$ from N separate sets of M late adopter members, where $1 \leq i \leq N$ and $1 \leq j \leq M$, wherein said least frequently occurring late adopter members are classified as trend laggers;

introducing the particular item for adoption by the K late adopter members;

measuring an acceptance value for the particular item by the K late adopter members of the online community; and generating a demand score identifying a predicted overall demand remaining for the particular item.

22. A computer-readable storage medium having stored thereon, computer-executable instructions that, if executed by a computing device, cause the computing device to perform a method comprising:

identifying a first item having an adoption rate above a first predetermined level;

calculating a score reflecting the percentage of times the first item and one or more second items which have an adoption rate below a second predetermined level are presented together;

identifying at least one second item which has an upper-half score relative to the first item, and has a lower-half score relative to others of the one or more second items; and repeating the calculating and the identifying to identify a first set of first items that each have adoption rates above the first predetermined level, and a second set of second items that have the correlation score relative to the first set of first items above a third predetermined level.

23. A demand identification system for identifying demand by an online community for a particular item, comprising:

means for compiling a set of N items $\{X_1, X_2, \ldots, X_i, \ldots, X_N\}$, wherein for each item $X_i$ amongst the set of N items, a plurality of M adopter members $\{Y[X_i]_1 \ldots Y[X_i]_M\}$ is determined resulting in N separate sets of M adopter members, said M adopter members being determined based on a time of adoption of said item $X_i$;

means for determining a set $K_1$ of the adopter members that occur most frequently and a set $K_2$ of the adopter members that occur least frequently in the set $\{Y[X_i]_j\}$ from N separate sets of M adopter members, where $1 \leq i \leq N$ and $1 \leq j \leq M$, wherein said most frequently occurring adopter members are classified as early adopter members and least frequently occurring adopter members are classified as late adopter members;

means for introducing the particular item for adoption by the $K_1$ early adopter members and that $K_2$ late adopter members;

means for measuring an acceptance value for the particular item by the $K_1$ early adopter members and the $K_2$ late adopter members of the online community; and means for generating a demand score identifying a predicted overall demand remaining for the particular item.

24. A potential demand identification system for at least one of a new product and a new service, comprising:

means for identifying one or more products and/or services which are characterized as being in demand by a majority of an electronic community;

means for identifying early adopters of the one or more products and/or services within an electronic community, wherein the early adopters are characterized by a ranking of their time of adoption for an item that is among the first in the online community and the item is later adopted by other members of the online community; and means for monitoring the activities of the early adopter members during a plurality of electronic data collection sessions, to determine a score for their collective impressions of the new product or new service.

25. A system, comprising:

a communications network;

a plurality of customer network devices;

a plurality of software components; and a plurality of electronic databases;

wherein the plurality of customer network devices is coupled to the plurality of software components and electronic databases by way of the communications network, and wherein a demand identification system for identifying demand by an online community for a particular item is implemented by:

compiling a set of N items $\{X_1, X_2, \ldots, X_i, \ldots, X_N\}$, wherein for each item $X_i$ amongst the set of N items, a plurality of M adopter members $\{Y[X_i]_1 \ldots Y[X_i]_M\}$ is determined resulting in N separate sets of M adopter members, said M adopter members being determined based on a time of adoption of said item $X_i$;

determining set $K_1$ of the adopter members that occur most frequently and to determine a set $K_2$ of the adopter members that occur least frequently in the set $\{Y[X_i]_j\}$ from N separate sets of M adopter members, where $1 \leq i \leq N$ and $1 \leq j \leq M$, wherein said most frequently occurring adopter members are classified as early adopter members and least frequently occurring adopter members are classified as late adopter members;

introducing the particular item for adoption by the $K_1$ early adopter members and that $K_2$ late adopter members;

measuring, by use of one or more of the plurality of software components, an acceptance value for the particular item by the $K_1$ early adopter members and the $K_2$ late adopter members of the online community; and generating, by use of one or more of the plurality of software components, a demand score identifying a predicted overall demand remaining for the particular item.

* * * * *

UNITED STATES PATENT AND TRADEMARK OFFICE
CERTIFICATE OF CORRECTION

| | | |
|---|---|---|
| PATENT NO. | : 7,885,849 B2 | Page 1 of 1 |
| APPLICATION NO. | : 10/862931 | |
| DATED | : February 8, 2011 | |
| INVENTOR(S) | : Gross | |

It is certified that error appears in the above-identified patent and that said Letters Patent is hereby corrected as shown below:

On Title Page 3, item (56), under "Other Publications", Line 16, delete "Miguel," and insert -- Miquel, --.

On Title Page 3, item (56), under "Other Publications", Line 32, delete "Systems;"" and insert -- Systems," --.

Column 29, line 59, in Claim 9, delete "and/or" and insert -- or --.

Column 32, line 63, in Claim 25, delete "set" and insert -- a set --.

Signed and Sealed this
Tenth Day of April, 2012

David J. Kappos
*Director of the United States Patent and Trademark Office*